United States Patent
Carlson

(10) Patent No.: US 8,543,468 B2
(45) Date of Patent: *Sep. 24, 2013

(54) BIDDING TO RECEIVE DATA AFTER A CONSUMER IS IN A ZONE

(75) Inventor: Mark Carlson, Half Moon Bay, CA (US)

(73) Assignee: VISA U.S.A. Inc., San Francisco, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 12/428,324

(22) Filed: Apr. 22, 2009

(65) Prior Publication Data

US 2010/0274669 A1   Oct. 28, 2010

(51) Int. Cl.
*G06Q 30/00* (2012.01)
*G06Q 30/08* (2012.01)

(52) U.S. Cl.
CPC .................................... *G06Q 30/08* (2013.01)
USPC ........................................ 705/26.3; 705/26.1

(58) Field of Classification Search
None
See application file for complete search history.

(56) References Cited

U.S. PATENT DOCUMENTS

| | | | |
|---|---|---|---|
| 5,857,175 A | 1/1999 | Day et al. |
| 6,055,513 A | 4/2000 | Katz et al. |
| 6,332,126 B1 | 12/2001 | Pierce et al. |
| 7,013,149 B2 | 3/2006 | Vetro et al. |
| 7,376,431 B2 | 5/2008 | Niedermeyer |
| 7,478,054 B1 | 1/2009 | Adams et al. |
| 7,496,523 B2 | 2/2009 | Walker et al. |
| 7,536,324 B2 | 5/2009 | Perkowski |
| 7,711,598 B2 | 5/2010 | Perkowski |
| 7,761,381 B1 | 7/2010 | Fitch et al. |
| 7,840,224 B2 | 11/2010 | Vengroff |
| 8,032,413 B2 | 10/2011 | Carlson |
| 8,160,934 B2 | 4/2012 | Carlson et al. |
| 2002/0052786 A1 | 5/2002 | Kim |
| 2002/0065713 A1 | 5/2002 | Awada et al. |
| 2003/0033237 A1 | 2/2003 | Bwari |
| 2003/0096621 A1 | 5/2003 | Jana et al. |
| 2003/0220835 A1 | 11/2003 | Barnes |
| 2004/0034570 A1 | 2/2004 | Davis |
| 2004/0078273 A1 | 4/2004 | Loeb et al. |
| 2006/0004631 A1 | 1/2006 | Roberts et al. |
| 2007/0127650 A1 | 6/2007 | Altberg et al. |
| 2007/0173266 A1 | 7/2007 | Barnes |
| 2007/0179843 A1 | 8/2007 | Eichenbaum et al. |
| 2007/0255652 A1 | 11/2007 | Tumminaro et al. |
| 2008/0065495 A1 | 3/2008 | Nguyen |

(Continued)

FOREIGN PATENT DOCUMENTS

KR     1020020094340     12/2002

OTHER PUBLICATIONS

Shopkick, Inc., company product information located at www.shopkick.com/app.html, 2010.

(Continued)

*Primary Examiner* — Faris Almatrahi
(74) *Attorney, Agent, or Firm* — Greenberg Traurig, LLP

(57) ABSTRACT

An announcement distributor distributes, or auctions an opportunity to distribute, an announcement to an announcement recipient such as a consumer, issuer, merchant, or acquirer within a payment processing system. The announcement when there has been a satisfaction of an announcement condition, such as the consumer being determined to be located within a predetermined spatial zone. The content of the announcement may, in turn, facilitate a subsequent cashless transaction for resources of merchants. Implementations describe various permutations of the content of the announcement, the announcement condition, and the announcement recipient.

18 Claims, 8 Drawing Sheets

(56) References Cited

U.S. PATENT DOCUMENTS

| | | |
|---|---|---|
| 2008/0078831 A1 | 4/2008 | Johnson et al. |
| 2008/0156870 A1 | 7/2008 | Niedermeyer |
| 2008/0177662 A1 | 7/2008 | Smith et al. |
| 2008/0208762 A1 | 8/2008 | Arthur et al. |
| 2008/0268868 A1 | 10/2008 | Maitland |
| 2008/0300987 A1 | 12/2008 | Rand et al. |
| 2008/0301050 A1 | 12/2008 | DiGiacchino |
| 2009/0017811 A1 | 1/2009 | Cole et al. |
| 2009/0076925 A1 | 3/2009 | DeWitt et al. |
| 2009/0132365 A1 | 5/2009 | Gruenhagen et al. |
| 2009/0150218 A1 | 6/2009 | Brunner et al. |
| 2009/0222345 A1 | 9/2009 | Greene |
| 2010/0063969 A1 | 3/2010 | Kasargod et al. |
| 2010/0082420 A1 | 4/2010 | Trifiletti et al. |
| 2010/0082445 A1 | 4/2010 | Hodge et al. |
| 2010/0161404 A1 | 6/2010 | Taylor |
| 2010/0274566 A1 | 10/2010 | Carlson |
| 2010/0274567 A1 | 10/2010 | Carlson et al. |
| 2010/0274598 A1 | 10/2010 | Carlson |
| 2010/0274625 A1 | 10/2010 | Carlson |
| 2010/0274626 A1 | 10/2010 | Carlson |
| 2010/0274627 A1 | 10/2010 | Carlson |
| 2010/0274652 A1 | 10/2010 | Carlson |
| 2010/0274680 A1 | 10/2010 | Carlson |
| 2011/0173075 A1 | 7/2011 | Carlson et al. |
| 2011/0264540 A1 | 10/2011 | Carlson |
| 2011/0307338 A1 | 12/2011 | Carlson |

OTHER PUBLICATIONS

International Patent Application PCT/US10/32057, International Search Report, Dec. 7, 2010.

BIDDING TO RECEIVE DATA AFTER A CONSUMER IS IN A ZONE

FIELD

Implementations generally relate to communicating information to facilitate a transaction, and more particularly, to announcing transaction information to an announcement recipient after an announcement condition has been satisfied in order to facilitate a subsequent transaction.

BACKGROUND

Merchants spend a considerable amount of their investment dollars in marketing their resources to consumers. Often these marketing efforts are blind to the specific needs or preferences of the consumers they target, making them inefficient in influencing or predicting consumer purchasing decisions. Moreover, prediction of potential consumer purchasing decisions is further complicated when consumers make purchases for other consumers, such as gifts, or when consumers are influenced by other consumer's recommendations. Finally, a merchant's marketing efforts may not be executed at a time when a targeted consumer is susceptible to make a purchase.

On the other hand, many consumers now carry a portable consumer device capable of sending and receiving information, such as cellular telephones. Therefore, consumers are gaining access to more information as they make purchasing decisions. For example, a consumer may access a search engine with a browser executing on a World Wide Web enabled cellular telephone to search for specified resources that may be sold by merchants. However, the information the consumer receives may not be well directed to the needs or preferences of the consumer.

Accordingly, it would be an advance in the art of commerce to provide timely and well tailored communications to facilitate subsequent transactions.

SUMMARY

In one implementation, an announcement opportunity to have an announcement sent to an announcement recipient is auctioned to auction participants. The auction participants bid to receive the announcement when at least one specified condition occurs, including the presence of a consumer within a zone. The auction participant receives a notification when their bid to receive the announcement is a winning bid. After the at least one specified condition occurs, the winning auction participant, who is deemed to be the announcement recipient, then receives the announcement.

In another implementation, announcement opportunities to communicate with at least one consumer when a specified condition occurs are auctioned to a plurality of auction participants. The specified condition includes the presence of the consumer in a zone and at least one auction participant having a winning bid. After the specified condition occurs, a communication to the consumer from the auction participant having the winning bid is facilitated or enabled.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

Figure 1:
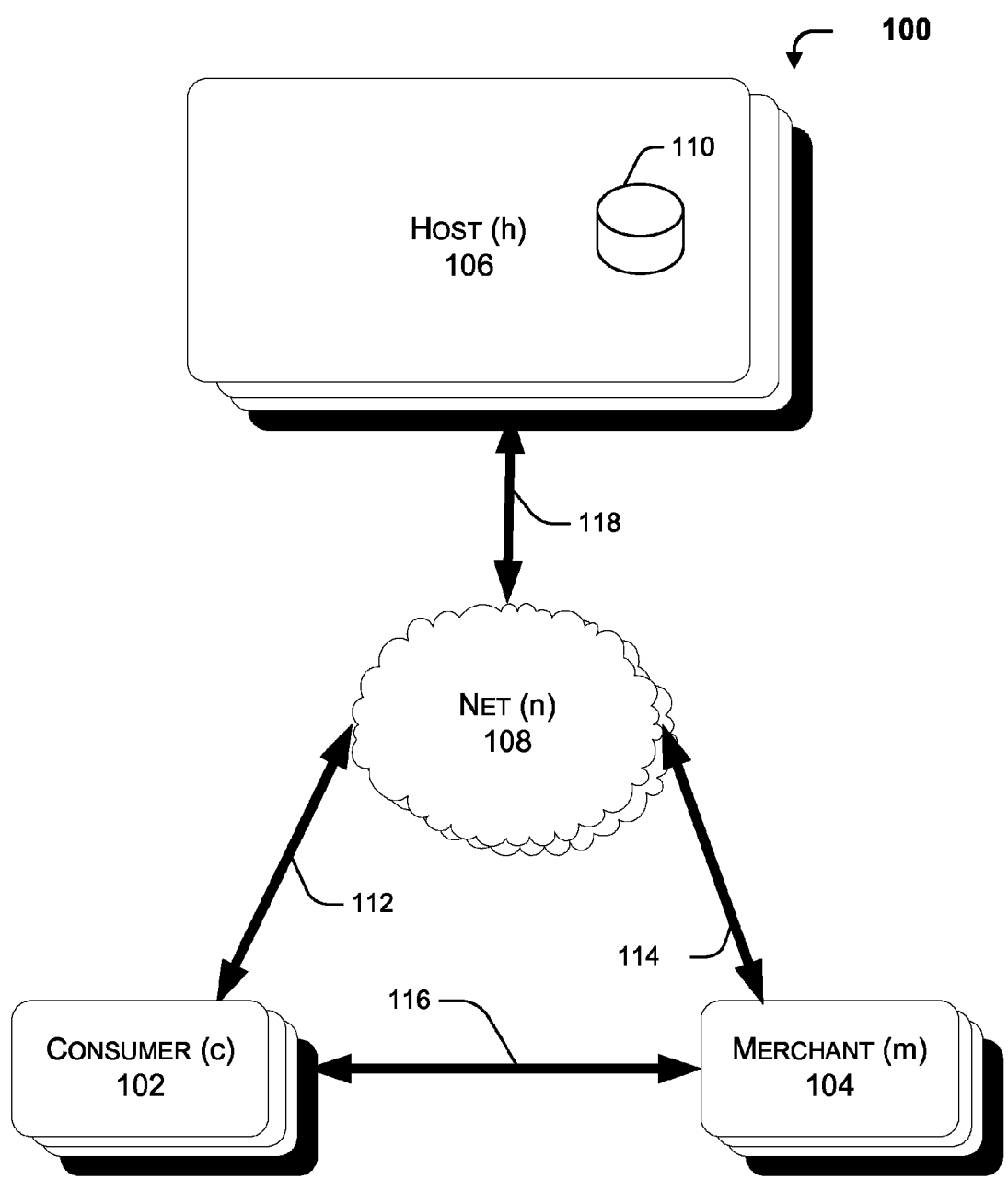
FIG. 1 depicts a block diagram illustrating an exemplary environment in which an announcement recipient receives an announcement.

A consumer and a merchant engage in a transaction for the purchase of a resource, such as a good and/or a service. The transaction or "purchase" can be a sale, a lease, a rental, an assignment, and/or a license, where some form of currency (e.g., money, "points" in a loyalty program, minutes for cellular telephony air time usage) is given the consumer to the merchant to purchase the resource. Alternatively, the transaction may also be gratuitous, such as a donation to a charitable organization, where the consumer is the donor and the charitable organization is the merchant receiving the donation. The consumer may be a person, an entity, or a group of persons or entities. The merchant may be, for example, a retailer, a wholesaler, a reseller, a manufacturer, a broker, a distributor, a provider, a charitable organization, or any entity in the distribution chain of resources. In a business-to-business environment, a first merchant may engaged in the transaction with the consumer that is a second merchant, such as a small business to whom the first merchant is a supplier of resources.

Methods, apparatus, systems, and transformations of particular articles to different states or things are disclosed, wherein a tailored announcement is timely sent to entities, such as consumers or merchants, in a chain of commerce to facilitate a subsequent transaction. The announcement may include information, for example, such as: a purchase price of a resource purchased in the past; a real-time location of the consumer, an indication of a number of times that the consumer has been in a spatial zone over a window of time; a transaction history of a targeted consumer; a sequential shopping pattern of multiple consumers; a coupon of a merchant; a report on past announcements sent to announcement recipients; or a combination of the forgoing.

Implementations for disseminating an announcement include various permutations of: variations on the content of the announcement, variations on an announcement condition that triggers the sending of the announcement, and variations on an announcement recipient receiving the announcement. For example, in one such implementation, the announcement is sent informing a merchant that a consumer with a particular purchasing history, is located within a spatial zone of interest to that merchant. In another such implementation, the announcement is not directly sent to the announcement recipient, but is auctioned off to bidders each submitting a bid for the right to be send their announcement to the announcement recipient. In yet another such implementation, the consumer requests and receives the announcement that indicates characteristics of past transactions of a specified merchant. In yet a further implementation, a set of resources of interest to a group of consumers is specified, the set is modified as the consumers within the group make purchases of the resources in the set, and the consumers in the group receive the announcement containing the modified set of resources.

Referring to FIG. 1, a block diagram illustrates an exemplary environment in which an announcement recipient receives an announcement by an announcement system 100. The announcement system 100 includes at least one consumer (c) 102 (e.g., the consumer) such as consumer (1) 102 through consumer (c) 102, where C can be up to and greater than an eight digit integer; at least one merchant (m) 104 (e.g., the merchant) such as merchant (1) 104 through merchant (M) 104, where M can be up to and greater than an eight digit integer; and at least one host (h) 106 such as host (1) 106 through host (H) 106, where H can be up to and greater than an eight digit integer (collectively "users"). The host (h) 106 may be an entity that utilizes a computer to receive and transmit data, store data, or execute algorithms (e.g., software), such as to compare the received data to the stored data. For example, the host (h) 106 may utilize a computer to execute an algorithm to determine if the announcement condition has been satisfied and to facilitate the transfer (e.g., transmission or broadcasting) of the announcement to the announcement recipient, such as the consumer (c) 102 or the merchant (m) 104.

The announcement system 100 may have at least one database DB 110. As appreciated by those skilled in the art, the DB 110 or components thereof may be any combination of databases, or the components thereof, in a single location or in multiple locations. Data stored in the DB 110 may be structured by a database model, such as a relational model or a hierarchical model, where the model may govern how the data stored in the DB 110 may be accessed. For example, query languages can be used to query the data stored in the DB 110 to locate records, or portions thereof, that are relevant to the query. DB 110 may include any of a variety of security features such as: access codes, firewalls, compression, decompression, encryption, de-encryption, or the like.

The data stored in the DB 110 may include information about the consumer (c) 102, the merchant (m) 104, the host (h) 106, or others, for example. This stored data may include: transaction information about transactions between the consumer (c) 102 and the merchant (m) 104; corporate records; information received from a user of announcement system 100, such as through a profile created by the user; or information purchased from external sources who supply such information. To illustrate, the transaction information may include trends in a transaction history of an account issued to the consumer (c) 102 by an issuer. The corporate records may include a location of the merchant (m) 104. A user profile of the merchant (m) 104 may include a merchant category of the merchant (m) 104, or a merchant identifier of the merchant (m) 104. The information purchased from an external source may include a Fair Isaac Corporation (FICO) score of the consumer (c) 102.

In one implementation, an inventory management system (IMS) of the merchant (m) 104 is connected to the announcement system 100 such that data about the resources of merchant (m) 104 in the IMS may flow to the DB 110. The merchant (m) 104 may use the IMS to track the flow of resources within the inventory of the merchant (m) 104. The IMS may include a computer software program capable of accessing a merchant database containing data about the resources within the inventory of the merchant (m) 104. The IMS may have a graphical user interface ("GUI") enabling the merchant (m) 104 to enter, delete, and analyze the data about the resources. The computer software program within the IMS may provide the capability of associating a description with an inventory item within the inventory of the merchant (m) 104, such as a category for the inventory item. The IMS may automatically transmit the data about the resources of the merchant (m) 104 to the DB 110 according to a preselected workflow.

Each user of announcement system 100 may be communicatively connected via a network Net 108 through a network device such as Net (1) 108 through Net (N) 810, where N can be up to and greater than an eight digit integer. Each Net (n) 108 may represent any of a variety of suitable means for exchanging data, such as: an Internet, an intranet, an extranet, a wide area network (WAN), a local area network (LAN), a virtual private network, a satellite communications network, an Automatic Teller Machine (ATM) network, an interactive television network, or any combination of the forgoing. Net (n) 108 may contain either or both wired and wireless connections for the transmission of signals including electrical, magnetic, and a combination thereof. Examples of such connections are known in the art and include: radio frequency connections, optical connections, etc, To illustrate, the connection for the transmission of signals may be a telephone link, a Digital Subscriber Line, or cable link. Moreover, Net (n) 108 may utilize any of a variety of communication protocols, such as Transmission Control Protocol/Internet Protocol (TCP/IP), for example.

Each Net (n) 108 may connect one or more users. For example, the consumer (c) 102 may be connected to the host (h) 106 via Net (n) 108, a satellite communication network, while the merchant (m) 104 may be connected to the host (h) 106 via Net (2) 108, an Internet communication network. Data flows between users of the announcement system 100 through their respective connections to one or more network devices (e.g., Net (n) 108)) that are networked within the network Net 108 in the announcement system 100.

There may be multiple nodes within the network Net 108, each of which may conduct some level of processing on the data transmitted within the announcement system 100. For example, a node within the Net (n) 108 may be a bank connecting the merchant (m) 104 to the host (h) 106. The bank, or other nodes, may also be one of the users of the announcement system 100.

The users of the announcement system 100 may communicate with one another through Net 108 and/or via communication channels. For example, consumer (c) 102 may communicate with: merchant (m) 104 via a channel 116; or host (h) 106 via channel 112, Net (n) 108, and a channel 118. Each communication channel in FIG. 1 is shown as a double arrow representing a plurality of signal and bidirectional communication channels. For example, the merchant (m) 104 may transmit data to the Net (1) 108 via channel 114 and receive data back from Net (2) 108 via channel 114. Similarly, consumer (1) 102 may communicate with consumer (2) 102 via a communication paths involving channel 112 and Net (n) 108.

Users of the announcement system 100 may interact with one another or receive data about one another within the announcement system 100 using any of a variety of communication devices. The communication device may have a processing unit operatively connected to a display and memory such as Random Access Memory ("RAM") and/or Read-Only Memory ("ROM"). The communication device may be combination of hardware and software that enables an input device such as a keyboard, a mouse, a stylus and touch screen, or the like.

Use of the announcement system 100 by consumer (c) 102 may include the use of a portable consumer device (PCD). The PCD may be a communication device, or may be used in conjunction with, or as part of, the communication device. Examples of the PCD include any of: a card (e.g., bank card, payment card, financial card, credit card, charge card, debit card, gift card, bus pass, smart card, access card, security card, healthcare card, or telephone card), a tag, a wristwatch, a key ring, a fob (e.g., SPEEDPASS® commercially available from ExxonMobil Corporation), a pager, a cellular telephone, a personal digital assistant, a digital audio player, a computer (e.g., laptop computer), a set-top box, a portable workstation, a minicomputer, or a combination thereof. The PCD may have near field or far field communication capabilities (e.g., satellite communication or communication to cell sites of a cellular network) for telephony or data transfer such as communication with a global positioning system (GPS). The PCD may support a number of services such as Short Message Service (SMS) for text messaging and Multimedia Messaging Service (MMS) for transfer of photographs and videos, electronic mail (e-mail) access.

The PCD may include a computer readable medium. The computer readable medium, such as a magnetic stripe or a memory of a chip or a chipset, may include a volatile, a non-volatile, a read only, or a programmable memory that stores data, such as an account identifier, a consumer identifier, and/or an expiration date. The computer readable medium may including executable instructions that, when executed by a computer, the computer will perform a method. Examples of the PCD with memory and executable instructions include: a smart card, a personal digital assistant, a digital audio player, a cellular telephone, a personal computer, or a combination thereof. To illustrate, the PCD may be a financial card that can be used by a consumer to conduct a contactless transaction with a merchant, where the financial card includes a microprocessor, a programmable memory, and a transponder (e.g., transmitter or receiver). The financial card can have near field communication capabilities, such as by one or more radio frequency communications such as are used in a "Blue Tooth" communication wireless protocol for exchanging data over short distances from fixed and mobile devices, thereby creating personal area networks (PANs).

Similarly, the merchant (m) 104 may interact with either the host (h) 106 or the consumer (c) 102 via a communication device, such as a Point of Interaction. A Point of Interaction (POI) can be a physical or virtual communication vehicle that provides the opportunity, through any channel (112, 114, 116, 118) to engage with the consumer (c) 102 or the host (h) 106 for the purposes of providing content, messaging or other communication, related directly or indirectly to the facilitation or execution of a transaction between the merchant (m) 104 and the consumer (c) 102. Examples of the POI include: a physical or virtual Point of Service (POS) terminal, the PCD of the consumer (c) 102, a portable digital assistant, a cellular telephone, paper mail, e-mail, an Internet website rendered via a browser executing on computing device, or a combination of the forgoing.

The PCD may interface with the POI using a mechanism including any suitable electrical, magnetic, or optical interfacing system such as a contactless system using radio frequency, a magnetic field recognition system, or a contact system such as a magnetic stripe reader. To illustrate, the POI may have a magnetic stripe reader that makes contact with the magnetic stripe of a healthcare card (e.g., Flexible Savings Account card) of the consumer (c) 102. As such, data encoded in the magnetic stripe on the healthcare card of consumer (c) 102 read and passed via channel 116 to the POI at merchant (m) 104. These data can include an account identifier of a healthcare account. The POI can then form a transmission including the account identifier for delivery to the host (h) 106 via channels 114, through Net (n) 108, and channel 118. In another example, the POI may be the PCD of the consumer (c) 102, such as the cellular telephone of the consumer (c) 102, where the merchant (m) 104, or an agent thereof, receives the account identifier of the consumer (c) 102 via a webpage of an interactive website rendered by a browser executing on a World Wide Web (Web) enabled PCD.

In some implementations, the announcement system 100 can include, or be included within, a payment processing system that includes a plurality of financial institutions (e.g., banks, credit unions, savings and loan institutions, brokerages, etc.) and at least one transaction handler, wherein users of the announcement system include: the transaction handler, the financial institutions, the consumer (c) 102, and the merchant (m) 104. Examples of payment processing systems include VisaNet® network, the American Express® network and the Veriphone® network. In some implementations, the financial institution and/or the transaction handler may provide at least some of the functions of the host (h) 106.

An Exemplary Payment Processing System

A payment processing system facilitates the processing of cashless transactions conducted through the use of an account such as a checking account, a line of credit, or a loyalty account wherein points are redeemed (e.g., 50 reward points in a loyalty program are equal to $20 (US) toward a purchase). Other examples of the accounts include: debit, revolving credit, charge, stored-value, prepaid (e.g., reloadable account, Flexible Spending Account, Healthcare Savings Account), gift, commercial, corporate, government, or a combination thereof. An issuer (e.g., one of the financial institutions in the payment processing system) may issue the account to the consumer (c) 102.

Figure 2:
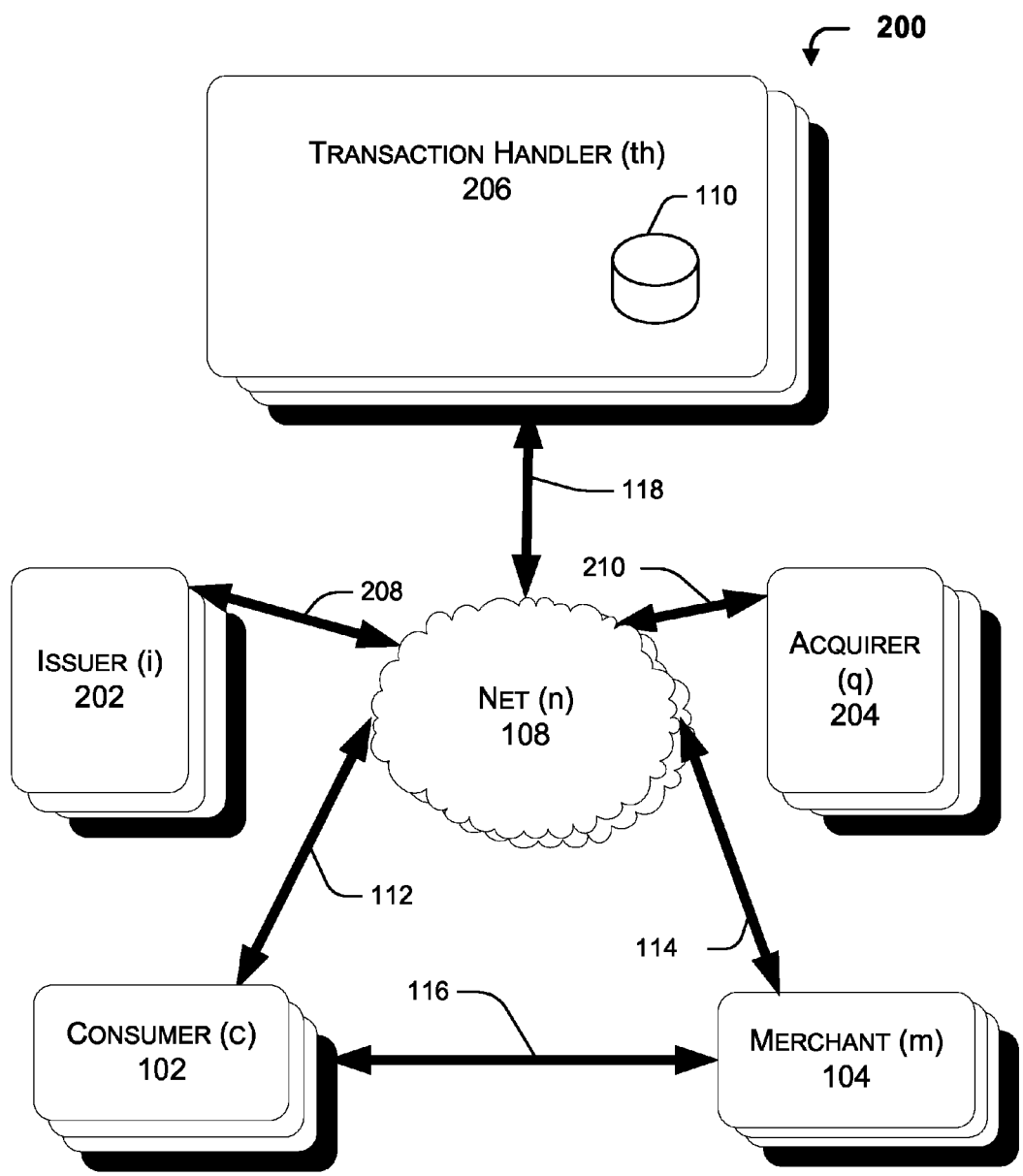
FIG. 2 depicts a block diagram illustrating an exemplary payment processing system that can be operated in the environment of FIG. 1.

An exemplary payment processing system 200 is depicted in FIG. 2. The payment processing system 200 includes at least one issuer (i) 202 (e.g., the issuer) such as issuer (1) 202 through issuer (i) 202, where "I" can be up to and greater than an eight digit integer; at least one transaction handler (th) 206 (e.g., the transaction handler) such as transaction handler (1) 206 through transaction handler (TH) 206, where TH can be up to and greater than an eight digit integer; at least one acquirer (q) (e.g., the acquirer) such as acquirer (1) 204 through acquirer (Q) 204, where Q can be up to and greater than an eight digit integer; the merchant (m) 104; and the consumer (c) 102. The consumer (c) 102 may be an account holder of the account issued by the issuer (i) 202, such as a joint account holder, or someone with access to the account, such as an employee with access to a corporate account. The acquirer (q) 204 and the issuer (i) 202 can communicate with the other users (102, 104, 206) of the payment processing system 200 via Net (n) 108.

The account may be associated with an account identifier. The account identifier may be, for example, any code, symbol, number, letter, digital signal, analog signal, digital certificate, biometric code, or other indicia usable to distinguish or identify the consumer (c) 102 or a corresponding account of the consumer (c) 102. Nonetheless, the account identifier of the account may be used to distinguish the past transactions of the consumer (c) 102 without knowing the identify of the consumer (c) 102, such as the legal name of the consumer (c) 102. For example, if ten of the past transactions of the consumer (c) 102 stored in the DB 110 were each conducted upon the account with the account identifier "4234567890123456," then each of the ten past transactions can be distinguished by filtering the data in the DB 110 using the account identifier "4234567890123456," even without knowing the legal name of the consumer (c) 102 to whom the account was issued by issuer (i) 202.

The account identifier can be used for purposes other than distinguishing the account, activities on the account, or the consumer (c) 102 within the payment processing system 200. For example, the account identifier may be a numeric code, wherein the first six numbers are a Bank Identification Number (BIN) that denotes the issuing bank and the category of the account associated with the account identifier (e.g., "gold card" account).

Typically, a transaction begins with consumer (c) 102 presenting an account identifier of an account of consumer (c) 102 to merchant (m) 104 to initiate an exchange of currency for a resource. Other data that may be presented to merchant (m) 104 may include an expiration date, a consumer name of the consumer (c) 102, and/or a Personal Identification Number (PIN). The transfer of data may be in any format recognizable by the merchant (m) 104, such as in a magnetic stripe track data format. For example, the consumer may present a PCD that is associated with the account to the POI of the merchant (m) 104 by swiping a plastic card in a magstripe card reader at the POI or by bringing an RFID enabled PCD in an effective proximity of an RFID reader so as to be interrogated.

Thereafter, the merchant (m) 104 may use the POI to form an authorization request that may including transaction information about the resource being purchased and the account identifier received from the consumer (c) 102. The transaction information may have several data fields. For example, as is known by those of ordinary skill in the relevant art, the data fields may include: a name of the consumer (c) 102, the account identifier (e.g., Primary Account Number or "PAN"), an expiration date of the PCD, a Card Verification Value (CVV), a Personal Identification Number (PIN), a discretionary code of the issuer of the account, a date, a time of the transaction, a merchant identifier (e.g., merchant indicator) of the corresponding merchant (m) 104, data usable to determine a location of the merchant (m) 104, a POI identifier, a total transaction amount, a Universal Product Code of the resource being purchased, a Stock Keeping Unit of the resource being purchased, a promotion code, or an acquirer code of the acquirer (q) 204 associated with the corresponding merchant (m) 104.

The authorization request may be communicated to the acquirer (q) 204, via Net (n) 108 using channels 114, 210. The acquirer (q) 204 forwards the authorization request, and perhaps other information, to transaction handler (th) 206 via Net (n) 108 using, for example, channels 210, 118. Transaction handler (th) 206 may, in turn, forward the authorization request, and perhaps other information, to the issuer (i) 202 that issued the account via channels 118, 208. In some implementations, the transaction handler (th) 206 may forward the authorization request to another transaction handler (th+1) 206 who then forwards the authorization request to issuer (i) 202.

An authorization response is transmitted in response to the authorization request. An authorization response includes the issuer (i) 202, or the transaction handler (th) 206 on behalf of the issuer (i) 202, authorizing the transaction in connection with business rules for authorization. For example, the issuer (i) 202 may determine that the account has enough funds to cover paying for the resources being purchased or that the transaction has a low risk of fraud based on a determined location of the merchant (m) 104 that is conducting the transaction with consumer (c) 102. Thereafter, the issuer (i) 202 may form the authorization response for delivery to the transaction handler (th) 206. The transaction handler (th) 206 may forward the authorization response to the acquirer (q) 204, who in turn forwards the authorization response to merchant (m) 104. Once approved, merchant (m) 104 may record the authorization and provide the resource to the consumer (c) 102.

The merchant (m) 104 may, at discrete periods, such as the end of the day, submit a list of authorized transactions to the acquirer (q) 204 for clearing and settlement. The acquirer (q) 204, in turn, requests clearing and settlement from the transaction handler (th) 206. The transaction handler (th) 206 may, but need not, compare the submitted authorized transaction list with its own log of authorized transactions to find matches. The transaction handler (th) 206 may, in turn, route the clearing and settlement request from the corresponding acquirer (q) 204 to the corresponding issuer (i) 202 that is involved in the corresponding transaction. Once the acquirer (q) 204 receives the funds from the account upon which the transaction was conducted, where the funds received from issuer (i) 202 matches a payment for the purchased resource, acquirer (q) 204 can make the funds available to the merchant (m) 104 less any transaction costs, such as fees. If the transaction involves a debit or pre-paid account, the acquirer (q) 204 may choose not to wait for the transfer of funds prior to paying the merchant (m) 104.

There may be intermittent steps in the foregoing process, some of which may occur simultaneously. For example, the issuer (i) 202 may transfer the funds to a clearing bank, which in turn, sends the funds to a settling bank that forwards the funds to the corresponding merchant (m) 104.

The transaction handler (th) 206 may maintain a log or history of the transactions as they pass through the payment processing system 200. In one implementation, the transaction handler (th) 206 may store the transaction information received during the processing of the transaction in the DB 110, such as: the transaction information received in the authorization request, the authorization response, or data received during the clearing and settlement process.

As stated previously, the data stored in the DB 110 in association with the consumer (c) 102 or the account of the consumer (c) 102, may include information about the consumer, such as demographics data for the consumer (c) 102 or data derived from information about the past transactions of consumer (c) 102, hereinafter "transaction information". Data derived from transaction information may include: a result from a bankruptcy predictor algorithm, predicting the likelihood that a particular of the consumer (1) 102 may file bankruptcy within a window of time; or a history of frequently purchased resources paid for through the use of the account of the consumer (1) 102, for example. This data may be derived through quantitative or qualitative research, market segment analysis, statistical modeling, regression analysis, econometrics, or data mining analysis, for example.

The payment processing system 200 can be operated in the environment of FIG. 1 to perform functions of announcement system 100. The users (e.g., the consumer (c) 102, the issuer (i) 202, the merchant (m) 104, the acquirer (q) 204, and/or the transaction handler (th) 206) in the payment processing system 200 may communicate with one another via Net 108 thereby transmitting or receiving information, such as the transaction information stored in the DB 110.

Delivery of Announcement to Announcement Recipient

The user may select the content of the announcement, the announcement condition and/or the announcement recipient. Thereafter, an announcement distributor (e.g., host (h) 106) sends the announcement to the selected announcement recipient after the announcement condition is satisfied.

The announcement condition may be selected based on the user's desired targeting goals. The targeting goals may focus on the timing of the delivery of the announcement, the relevance of the content of the announcement to the activities of the announcement recipient, or the location of the announcement recipient at the time the announcement recipient is to receive the announcement. For example, one of the targeting goals may be to send the announcement when the consumer (c) 102 is in a shopping mood, and therefore, more receptive to making a purchase or engaging in a transaction. Here, the announcement condition may be a real-time location of the consumer (c) 102 within a specified spatial zone (e.g., a specified shopping mall), for example. To illustrate, the host (h) 106 may receive a signal including data about the real-time location of the consumer (1) 102, such as a signal from a co-located cellular telephone of the consumer (1) 102, or a real-time authorization request for a transaction between the consumer (1) 102 and the merchant (1) 104. The host (h) 106 may utilize the data in the received signal to determine the real-time location of the consumer (1) 102, compare the determined real-time location of the consumer (1) 102 with a criterion of the announcement condition to find a match (e.g., the consumer (1) 102 is located in the specified shopping mall). If a match is found, the announcement is sent to the consumer (1) 102 (or other announcement recipients) within temporal proximity to finding the match (e.g., right after finding the match, within seconds or hours of finding the match). In this manner, the consumer (1) 102 may receive the announcement while the consumer (1) 102 is still in the shopping mood and the user's desired targeting goals are met.

Figure 3:
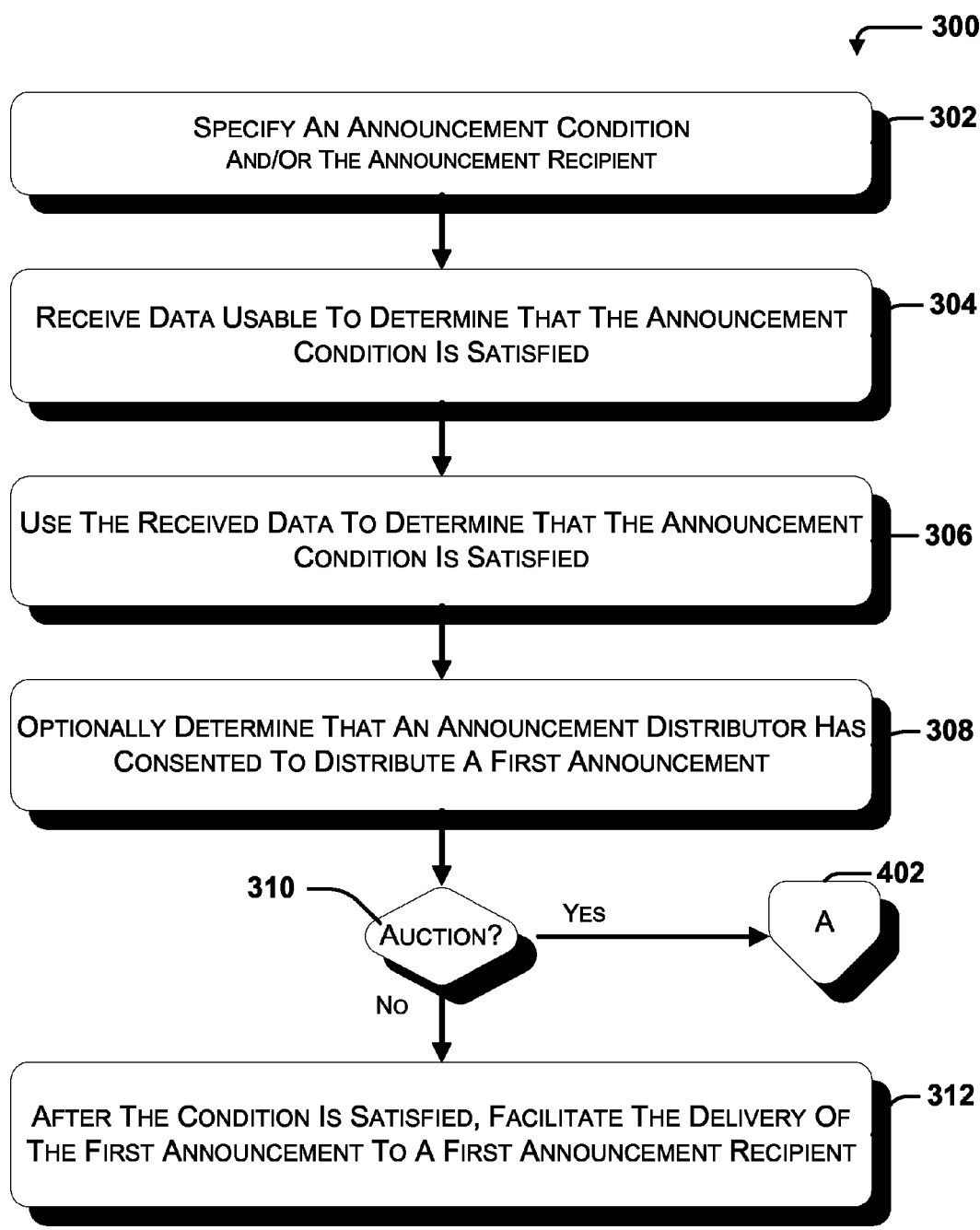
FIG. 3 depicts a flowchart of an exemplary method, that can be performed in the environment of FIG. 1, for an announcement distributor to provide the announcement to the announcement recipient.
Figure 4:
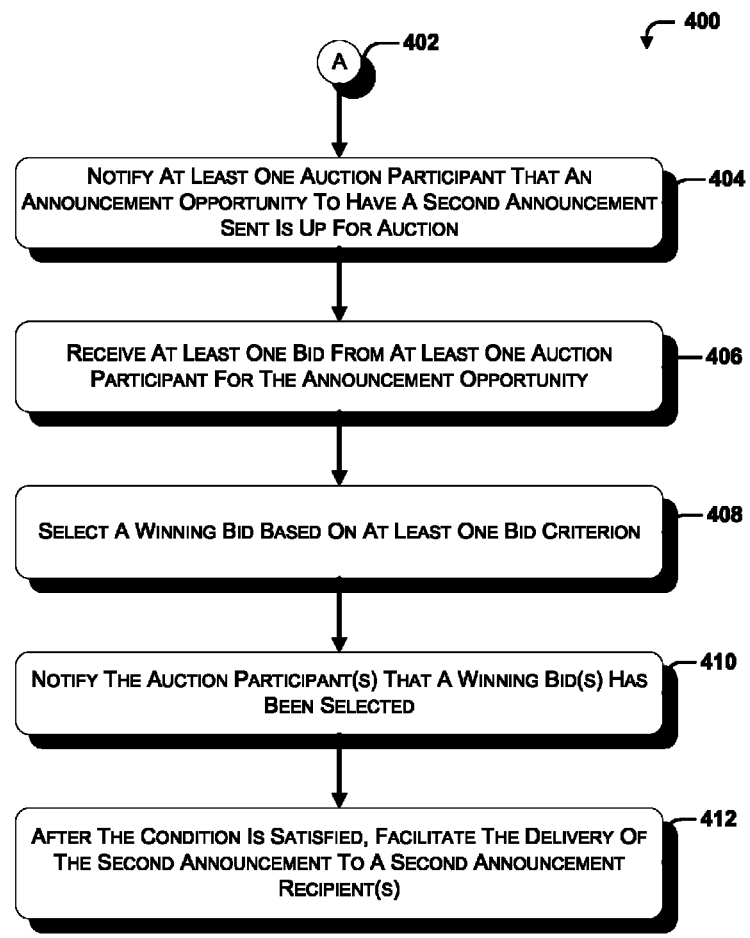
FIG. 4 continues the flowchart in FIG. 3, wherein the announcement distributor auctions the announcement to the announcement recipient.

Referring to FIGS. 3 and 4, flowcharts depict an exemplary method 300 this continued at reference numeral 400 in FIG. 4. In method 300, an announcement distributor provides and/or auctions at least one announcement to at least one announcement recipient. At a step 302, an announcement condition for announcing data to the announcement recipient is specified. In one implementation, at least one of the users specifies the announcement condition to host (-h) 106. For example, the merchant (m) 104 may select the announcement condition from a menu of announcement conditions at an interactive website linked to the transaction handler (th) 206 via channel 118.

An announcement condition can be specified to include one or more criterion. The announcement condition can be the occurrence of a physical activity, the status of specific data, the existence of a particular state, a time period (e.g., during daylight hours), a location within a spatial zone (e.g., a consumer is situated within a specified shopping mall but is not situated within a movie theater that is in the shopping mall), etc. When the announcement condition is satisfied, delivery of the announcement to the announcement recipient (s) is triggered. For example, the criterion may include: the transaction handler (th) 206 receiving one of the transactions of a selected consumer (c) 102 from the acquirer (q) 204 of the merchant (m) 104; a demographic of the consumer (c) 102; a category of the account of the consumer (c) 102 (e.g., gold card); a window of time in which the announcement is sent (e.g., sending the announcement: during hours of operation of a shop of the merchant (m) 104 or during the day, or during a lunch hour); a transaction history of one of the accounts of the consumer (c) 102, such as when a group of the transactions of the consumer (c) 102 show a tendency to purchase a particular type of resource; a tendency to purchase the resource of competitors of the merchant (m) 104; a seasonal trend in a purchasing behavior of the consumer (c) 102; a status of the PCD (e.g., the cellular telephone is "on"); or a combination of the forgoing.

In some implementations, at least one of the criterions of the announcement condition may be a presence or an absence of the consumer (c) 102 within a geographically specific zone (e.g., a region) such that the presence of the consumer (c) 102 in that zone triggers the announcement and/or affects the content of the announcement. The zone may be, for example, an Internet zone, a virtual zone, a spatial zone, or a combination thereof.

In one implementation, the announcement condition is specified to be the presence of the consumer (c) 102 within an Internet zone, where a PCD identified with the consumer (c) 102 is detected as being in communication with a pre-selected group of network devices (e.g., Net (n) 108 through Net (n+3) 108) that are having logic addresses within a specified set of Uniform Resource Locators (URLs), Internet Protocol (IP) addresses, or domain names (e.g., ".com and .org" or "www.cnn.com and www.msnbc.com") with sub-domain names (e.g., www.cnn.com/health").

In another implementation, the announcement condition is specified to be the presence of the consumer (c) 102 within a virtual zone having virtual borders within a virtual environment. Such an environment is graphically depicted in a display rendered by a computer. The consumer (c) 102 may be a gamer that operates a graphical user interface so as to navigate a virtual character identifiable to consumer (c) 102 that is detected as entering or exiting the virtual zone.

In another implementation, the announcement condition is specified to be the detected presence of the consumer (c) 102 within a spatial zone having geographic borders, for instance, a specific radius of three kilometers defined about a specified center point located within a store of merchant (m) 104 (e.g., within three kilometers above a location within the store of the merchant (m) 104). However, the borders for the spatial zone need not have a defined and rigid geometric shape. In yet another implementation, the announcement condition is specified to be the detected absence of the consumer (c) 102 within a spatial zone having geographic borders. For instance, the condition may include the absence of the consumer (c) 102 within one or more specified restaurants. Therefore, if the consumer (c) 102 is detected to be in the spatial zone (i.e., the consumer is detected as being situated within one of the specified restaurants), the condition is not satisfied and the announcement recipient (e.g., the consumer (c) 102) will not receive the announcement. For example, if the consumer (1) 102 is detected to be present within a restaurant, presumptively dinning out, the consumer (1) 102 will not receive an announcement. In yet a further implementation, the announcement condition is specified to be the detected presence of the consumer (c) 102 within a first spatial zone having geographic borders and the detected absence of the consumer (c) 102 within a second spatial zone. For example, the announcement condition can be specified to be the presence of the consumer (1) 102 near a specified street but not near a specified cross section of the street with another street (e.g., consumer (1) 102, "Sally", is near Michigan Street in Chicago, Ill. but is not detected as being at the cross section of Michigan and Wacker in Chicago, Ill.).

An algorithm can be specified so as to operate upon data such that, when the algorithm operates on the data, a determination is made as to whether the announcement condition has been satisfied. In one implementation, the transaction handler (th) 206 may operate the algorithm, by uses of a computing system, so as to access data stored in the DB 110 or in data associated with transactions as they pass through the payment processing system 200. The operation of the algorithm upon these data can thereby determine if the announcement condition has been satisfied. For example, the announcement condition require that consumer (c) 102 be moving in a particular direction (e.g., movement towards or away from the location of store of the merchant (m) 104). The algorithm may operate upon position data for the consumer (c) 102 over a period of time, where these data are derived the direction of movement of the consumer (c) 102 or where the direction of the consumer (c) 102 must match a required direction of movement and thereby satisfy an announcement condition.

The announcement recipient may be selected at the step 302. The announcement recipient may be any individual or entity that can receive the announcement, such as any of the users of an announcement system. The selection of the announcement recipient may include providing a logical address, such as an e-mail address or telephone number, that can be used to electronically transmit the announcement to the announcement recipient. For example, the merchant (m) 104 may specify the announcement condition: "notify me at sale@merchant.com when any [consumer (c) 102] in [the payment processing system 200] has made an online purchase of a tree from my competitor's retail nursery store." Alternatively, or in combination, the announcement distributor may use any electronic method of looking up an address for an identified announcement recipient. To illustrate, the consumer (1) 102 may specify to the transaction handler (th) 206 that the consumer (2) 102 is the announcement recipient. The transaction handler (th) 206 may access the DB 110 to determine the address of the consumer (2) 102 that can be used to send the announcement to the consumer (2) 102.

The announcement recipient need not be the user specifying the announcement condition. Stated another way, the criterion of the announcement condition may be specified by one of the users of the announcement system that is different from the announcement recipient. For example, the transaction handler (th) 206 specifying the announcement condition can also specify the consumer (1) 102 as the announcement recipient. To illustrate, the consumer (1) 102 may create a profile with the transaction handler (th) 206 that includes an account identifier of an Individual Retirement Account (IRA) of the consumer (1) 102. The transaction handler (th) 206 can specify: "if [the consumer (1) 102] profile has an IRA, then determined a time zone of [the consumer (1) 102] based on a data received from a co-located cellular telephone of [the consumer (1) 102] and send to the cellular telephone the announcement about the status of stock trade rates for stock in the IRA every Monday at 8:00 a.m. in the determined time zone."

Similarly, other users of the announcement system may specify the consumer (1) 102 as the announcement recipient for their respective announcements. For example, the issuer (i) 202 that has issued the account to the consumer (c) 102 may specify the consumer (c) 102 as the announcement recipient, such as "send the announcement to [the consumer (2) 102] after [the consumer (2) 102] has charged over $300 US on the charge account that was issued to [the consumer (2) 102]." In yet another example, the merchant (m) 104 may have a personal shopper that typically assists the consumer (3) 102 when the consumer (3) 102 shops at the store of the merchant (m) 104. The merchant (m) 104 may specify the announcement condition such that the consumer (3) 102 receives a message on their cellular telephone indicating whether or not the personal shopper is located at a store near the present location of their cellular telephone.

At a step 304, data usable to determine if the announcement condition has been satisfied is received via at least one of the Net (n) 108. For example, the received data may be the transaction information received during the processing of the corresponding transaction in the payment processing system 200. Alternatively, or in combination, the received data may be the position data of the PCD received from the PCD or from a Bluetooth reader via the Net (n) 108 (i.e., satellite network or the Internet), for example.

The received data may be the transaction information. To illustrate, a targeting merchant (m) 104 may be interested in transactions of a targeted consumer (c) 102 (e.g., one of the consumers 102 that has a gold account). The transactions of the targeted consumer (c) 102 may be with a surrogate merchant (m) 104, such as a competitor of the targeting merchant (m) 104 or one of the merchants 104 that the targeting merchant (m) 104 is collaborating with to mutually increase sales to the consumer (c) 102. Therefore, the targeting merchant (m) 104 may specify the announcement condition as the occurrence of the transaction between the targeted consumer (c) 102 and the surrogate merchant (m) 104 within the payment processing system 200. When the transaction handler (th) 206 receives an authorization request for a transaction between the surrogate merchant (m) 104 and the targeted consumer (c) 102, the transaction handler (th) 206 may process the transaction as usual, forwarding the authorization request to the corresponding issuer (i) 202 for authorization. The transaction handler (th) 206 may also use the transaction information in the received authorization request to determine if any of the announcement conditions in the announcement system 100 have been satisfied at a step 306. Here, the transaction handler (th) 206 may determine that the announcement condition of the targeting merchant (m) 104 is satisfied, or has occurred, because the consumer (c) 102 has conducted a transaction with the surrogate merchant (m) 104.

If the announcement condition is the presence of the consumer (c) 102 within a geographic zone, the received data may be data usable to determine the location of the consumer (c) 102. For example, the received data can be the transaction information that is received approximately in real-time, or can be data that is received from a co-located PCD of the consumer (c) 102. The transaction information received approximately in real-time may be an authorization request that is transmitted to the transaction handler (th) 206. The authorization request may contain a code from which the location of the merchant (m) 104 can be determined, such as a Merchant Category Code (MCC) or another merchant identifier of the corresponding merchant (m) 104. In one implementation, the transaction handler (th) 206 may presume that the consumer (c) 102 is still in the same location as the POI of the merchant (m) 104 as the authorization of the transaction is occurring because the transaction information is being received approximately in real-time. As such, the location of the consumer (c) 102 can be reliably determined from the code that was received code with the authorization request.

Alternatively, or in combination with the above implementation, the received data may include data from a PCD that is co-located with consumer (c) 102. The PCD will be deemed to be co-located with the consumer (c) 102 when the location of the consumer (c) 102 can be reasonably determined from data received from the PCD. For example, the PCD of the consumer (c) 102 may be a cellular telephone with location detecting capabilities as are known in the art (e.g., cellular telephony, triangulation, global positioning system (GPS), the PCD's detection of wireless networks the geographic location of which can be determined from a preexisting database of wireless network locations, etc.) To illustrate, the consumer (c) 102 may carry a cellular telephone having a GPS receive, or a functional equivalent thereof, while shopping at a shopping mall. As such, the cellular telephone will receive location coordinates from which the location of the PCD can determined. The determined position, or coordinates, may in turn, be transmitted to the host (h) 106 via the Net (n) 108. The determined position can be expressed in a variety of forms including: a street address; a latitude, a longitude or an altitude; World Geodetic System coordinates; data usable to determine a direction, speed, and/or acceleration of the PCD's movement; combinations of the forgoing, or a time rate of change of the foregoing, etc.

The received data may contain information from more than one of the PCDs. For example, a first consumer (1) 102 may have a first PCD that is wireless Radio Frequency IDentifier (RFID) enabled payment card that does not have position detecting capabilities, while a second consumer (2) 102 may have a second PCD that is an RFID receiver and a location detector. The first and second PCDs may come in close proximity to each other. The first PCD may transmit a radio frequency signal containing a first consumer identifier of the first consumer (1) 102 to the second PCD. The second PCD may, in turn, transmits both its real-time location and the first consumer identifier to the host (h) 106 via channel 112 that connects the second consumer (2) 102 to the Net (n) 108, and channel 118.

At a step 306, the data received in the step 304 is used to determine whether the announcement condition is satisfied. The data received in the step 306 and/or the data stored in the DB 110, may be accessed and compared to each of the criteria of the announcement condition to determine if there is a corresponding match. If the match exists, then the announcement condition is deemed to be satisfied. Logic rules may dictate which, or how many, of the criteria should be matched in order to determine the announcement condition as satisfied. For example, the logic rules may indicate that the data received in the step 306 and/or the data stored in the DB 110 should either match both a first criterion and a second criterion or match a third criterion to determine the announcement condition as satisfied.

In the above example, the targeting merchant (m) 104 may have specified the announcement condition as: "when one of [the consumers (1–c) 102], having a gold credit account, shops with my direct or substitute competitor, send [the consumer (c) 102] the announcement including my offer." After an authorization request is sent to the transaction handler (th) 206 from the POI of the competitor merchant (m) 104, the transaction handler (th) 206 may compare the data in the authorization request with the data stored in the DB 110 to determine if the announcement condition is satisfied. For example, the transaction handler (th) 206 may determine if the authorization request is for a transaction with the direct competitor of the targeting merchant (m) 104 by comparing a merchant identifier in the authorization request with the merchant identifier of the targeting merchant (m) 104 stored in the DB 110. If the merchant identifiers are each associated with the same merchant category, then the authorization request is for a transaction with a direct competitor of the targeting merchant (m) 104. Similarly, the transaction handler (th) 206 may determine if the authorization request is for a transaction with the substitute competitor of the targeting merchant (m) 104 by determining that the merchant categories of each of the targeting merchant (m) 104 and the surrogate merchant (m) 104 are associated with one another. For example, the merchant category of the targeting merchant (m)104 may be for a "pastry shop" while the merchant category of the surrogate merchant (m) 104 may be for an "ice cream shop." The "pastry shop" merchant category and the "ice cream shop" merchant category may be associated with one another because each corresponding merchant (m) 104 may be considered a retailer of sweet food items that can serve as deserts. Therefore, because the merchant categories are associated with one another, such as by corresponding identifiers that are logically associated with their merchant categories, they can be considered as substitute competitors.

Other criterion of the announcement condition of the targeting merchant (m) 104 may also be matched. For example, the transaction handler (th) 206 may determine that the consumer (c) 102 has the gold credit account by comparing a received BIN in the authorization request with the BINs of gold credit accounts stored in the DB 110. In another example, the announcement condition may include a specified name of the targeted consumer (1) 102 (at the step 302). The transaction handler (th) 206 may use an account identifier received in the authorization request to access the DB 110 and retrieve a name of the consumer (c) 102 associated with the account identifier. If the name retrieved from the DB 110 matches the specified name of the targeted consumer (1) 102, then the corresponding criterion is considered satisfied.

Data received in the step 304 can be used to derive other data that is then compared with the criterion. For example, the issuer (i) 202 may have specified the announcement condition "send the announcement to me when [the consumer (c) 102] that is located in the mall is within $100 US of the credit limit of the account that was issued to [the consumer (c) 102]." Thereafter, the transaction handler (th) 206 receives an authorization request for a transaction of the consumer (c) 102 that is being conducted upon that account for $50 US. The transaction handler (th) 206 may then calculate the total charge on the account by combining the newly charged $50 US with the transaction history of the account of the consumer (c) 102 that is stored in the DB 110. The transaction handler (th) 206 may then compare the calculated total charge with the above $100 US criterion to determine if the announcement condition is satisfied.

In another example, the PCD of the consumer (c) 102 may execute an algorithm that determines if a criteria of a corresponding announcement condition is met, and then transmit its determination to the host (h) 106. For example, the PCD of the consumer (1) 102 may have an applet that not only receives and transmits location data but also determines whether the PCD is in a spatial zone matching a criterion of the announcement condition. To illustrate, the consumer (1) 102 may create a profile on an interactive website of the host (h) 106 for use in the announcement system 100. The consumer (1) 102 may indicate an interest in receiving announcements when the consumer (1) 102 is located the spatial zone. The consumer (1) 102 may download information about the spatial zone unto the PCD of the consumer (1) 102. When the location of the PCD is determined by the PCD, the PCD may compare its determined location with the downloaded information about the spatial zone to see if there is a match. The PCD may transmit the matching result to the host (h) 106, thereby indicating that the consumer (1) 102 is in the spatial zone. The host (h) 106 may, in turn, determine if an announcement condition for any user in the announcement system 100 has been satisfied by the presence of the consumer (1) 102 in the spatial zone. If an announcement condition is satisfied, then the host (h) 106 may transmit to the PCD of the consumer (1) 102 the announcement that corresponds to the announcement while the PCD is still within that spatial zone.

Alternatively, or in combination, the PCD may determine if the announcement condition is satisfied. In one implementation, the PCD may download an applet usable to determine if at least one announcement condition is satisfied. The PCD can determine its location and, via execution of the applet, compare its location with at least one location criterion (e.g., a specified spatial zone) of a corresponding downloaded announcement condition to see if there is a match. The PCD may form a transmission addressed to the host (h) 106 indicating an outcome of this comparison. For example, if the corresponding criteria of at least one of the announcement conditions is satisfied, the PCD can form a transmission informing the host (h) 106 of those announcement conditions that were satisfied. The host (h) 106 may, in turn, form a transmission that includes an announcement corresponding to the satisfied announcement condition(s) for delivery thereof to corresponding announcement recipient(s).

At a step 308, a determination is optionally made as to whether the announcement distributor has consented to distribute the at least one announcement to the announcement recipient. For example, while a first user may affirmatively consent to distribution of data about the first user within the announcement system 100, a second user may request that the data about the second user not be distributed to any other user but the second user. To illustrate, the transaction handler (th) 206 may determine access rights by, for example, determining if the consumer (c) 102 can have access to the transaction information of the merchant (m) 104 based on contractual obligations of the transaction handler (th) 206 to the merchant (m) 104. In another example, the announcement distributor may be restrained from lawfully sending announcement due to privacy laws that may apply to the distribution of the data in the announcement. In such cases, the announcement distributor will be deemed not to have consented to distribute the announcement.

If at least one of the announcements is to be sent to the announcement recipient after an auction, the step 310 proceeds to a step 402 in the FIG. 4, otherwise the step 310 proceeds to a step 312.

At the step 312, the delivery of the announcement to the announcement recipient is facilitated if the announcement condition is satisfied in the step 306. In the above example of the targeting merchant (m) 104 and the surrogate merchant (m) 104, the announcement may be sent to the targeting merchant (m) 104, wherein the announcement includes data about the transaction of the surrogate merchant (m) 104 with the consumer (c) 102. For example, the targeting merchant (m) 104 may receive a transmission indicating that the consumer (c) 102, having the gold credit account, has just purchased a Rolex® watch from the surrogate merchant (m) 104. Having received the announcement, the targeting merchant (m) 104 may send a personalized catalog to the consumer (c) 102 via e-mail. The catalog, for instance, could be showcasing accessories for the Rolex® watch that are sold by the targeting merchant (m) 104.

As stated previously, the announcement may be transmitted to any of the suitable communication devices of the announcement recipient via the Net (n) 108. For example, the announcement may be sent via channel 114 to the POI of the merchant (m) 104 for delivery to the consumer (c) 102, such as when the announcement is printed on the back of a paper receipt memorializing the transaction with the consumer (c) 102. Alternatively, or in combination, the announcement may be first received at the POI of the merchant (m) 104, and then be sent to the PCD of the consumer (c) 102 via an RFID transmission across channel 116. In another example, the announcement may be sent to the PCD (e.g., the cellular telephone) of the consumer (c) 102 via channel 112, such as when the consumer (c) 102 receives an e-mail at an e-mail enabled cellular telephone, where the e-mail contains an offer of the merchant (m) 104. In another example, the announcement may be sent to the issuer (i) 202 via channel 208, such as when the issuer (i) 202 receives the announcement: at a computer of the issuer (i) 202 informing the issuer (i) 202 that the consumer (c) 102 typically uses the account issued by the issuer (i) 202 to purchase children's shoes in the month of September and it is currently the month of August; or as an automated voice message sent to a telephone of the issuer (i) 202 and informing the issuer (i) 202 that a small-business account of the consumer (c) 102 is nearing its credit limit. In yet another example, the acquirer (q) 204 may receive an announcement that was sent over channels 210, 114, where the announcement informs the acquirer (q) 204 that a payment toward a purchase order of the merchant (m) 104, long overdue, has finally been cleared and settled.

In some implementations, the announcement may facilitate communication about the resources of the merchant (m) 104 to the consumer (c) 102. For example, the merchant (1) 104 may receive the announcement including the name of the consumer (1) 102 that was detected as just having walked into one of the stores of the merchant (1) 104. The merchant (1) 104 may search a local merchant database to determine if the consumer (1) 102 has a personal shopper that has assisted the consumer (1) 102 in the past. The merchant (1) 104 may have an automated voice message sent to the personal shopper. The automated voice message may request that the personal shopper greet the consumer (1) 102 as well as market the resources of the merchant (m) 104 to the consumer (1) 102 as also as the consumer (1) 102 is still in the one of the stores of the merchant (1) 104.

After the announcement is received, other transmissions can be sent through the announcement system 100. For example, the announcement recipient may send a confirmation that the announcement was received or form a transmission to the host (h) 106 for delivery to another announcement recipient. To illustrate, the announcement may be received as a coupon that can be graphically rendered by a browser executing on a PCD of the consumer (3) 102, where the rendered coupon has hyperlinked buttons for accepting or declining an offer of the merchant (1) 104. The consumer (3) 102 may electronically accept the offer of the merchant (1) 104 by selecting an "accept" button rendered on by the browser of the PCD. The acceptance may be transmitted to the Net (3) 108, and then sent to the merchant (1) 104 via channel 114. Alternatively, or in combination, the acceptance may be transmitted via the Net (1) 108 to the acquirer (q) 204 via channel 210, and then sent to the merchant (1) 104 via channel 210 to Net (2) 108, and then sent to the merchant (1) 104 via channel 114.

Alternatively, or in combination, if at least one announcement distribution is to be auctioned to the user(s) of the announcement system, then the method 300 moves from the step 310 to a step 402 of the FIG. 4. The announcement system 100 may be used to auction an announcement opportunity. The successful bidder(s) of the action will thereby by the announcement opportunity to have one or more announcements delivered to one or more announcement recipients.

At a step 404, at least one auction participant (e.g., one of the users) is notified that the announcement opportunity is up for auction. In one implementation, the transaction handler (th) 206 may transmit an electronic message via the Net (n)

108 to the users that have indicated an interest in taking part in the auction within the announcement system 100. For example, the electronic message may be an alert sent to a computer of each auction participant, such as a pop up window enabled by an Internet browser executing on the computer of the auction participant. The alert may have a hyperlink to the website at which the auction participant can submit bids to 'win' the announcement opportunity. Alternatively, the electronic message may be an e-mail message or an electronic voice message sent to the auction participant. Other forms of electronic messages, as are know by those of ordinary skill in the relevant art, are also contemplated.

The auction may initiate after an auction initiating condition has been satisfied. For example, the auction initiating condition may be a required number of auction participants for a particular auction. Other auction initiating conditions may include: a time of day, a date, a number of announcement opportunities that can be bundled and auctioned together, receipt of an auctioning fee from the auction participants, the satisfaction of a particular announcement condition (e.g., presence of the consumer (c) 102 in the zone), or a combination of the foregoing.

The auction for the announcement opportunity may be initiated before, during, or after the announcement condition is satisfied because the auction initiating condition and the announcement condition need not be the same. For example, the auction initiating condition may be a particular time of a particular day (e.g., 9:00 a.m. on Jul. 10, 2008) that the auction is to begin, while the announcement condition may be the presence of the consumer (c) 102 in the spatial zone after the particular time of the particular day. Consequently, in this example, the auction participants may submit bids on Jul. 10, 2008 and the winning bidder(s) of the auction will receive the opportunity to send announcement(s) to the consumer (c) 102 when the consumer (c) 102 enters the spatial zone, for instance, on the later date of Oct. 31, 2008.

Alternatively, the announcement condition and the auction initiating condition may be same. For example, if the auction initiating condition and the announcement condition is the presence of the consumer (c) 102 in the spatial zone, the auction participants may receive a notice that the auction has commenced when the consumer (c) 102 enters the spatial zone. Thereafter, the winners of the auction can be selected and the winners of the auction can have their respective announcements delivered while the consumer (c) 102 is still present in the spatial zone.

The auction may be electronically conducted. For example, the auction participants may access an auction website at which the auction participant or agent thereof may submit a corresponding bid to an auctioneer for the announcement opportunity to have their announcement delivered to the announcement recipient. In one implementation, the auction participant may log onto a secure website and submit bids to the host (h) 106 via in an interactive, live electronic auction. In another implementation, the auction participant may transmit an e-mail containing a silent bid to the transaction handler (th) 206 that is the auctioneer of the announcement opportunity in an electronic auction that is not live.

The auction may be any of a variety of auction types. For example, as is known by those of ordinary skill in the relevant art, the auction can be:

an English auction, wherein bidders bid openly toward an ascending price;
a Dutch auction, wherein bidders bid openly toward a descending price;
a buyout auction wherein any bidder can immediately win the auction by bidding a preset price;
a sealed-bid first-price auction, wherein bidders submit sealed bids that are not known by other bidders and the winner is the highest bidder;
a sealed-bid second-price auction, wherein bidders submit sealed bids and the winner pays the second highest bid that was submitted rather than the highest bid that was submitted;
a silent auction, wherein bidders submit silent bids and the highest bidder, who is the winner of the auction, pays the price that they submitted;
an all-pay auction wherein bidders pay their bids regardless of whether the bidder has the winning bid;
a combinatorial auction, wherein bidders bid on packages of bidding items in an "all-or-nothing" fashion;
a reserve auction, wherein the auctioned item will not be sold if the final bid is below a preset price;
a no-reserve auction, wherein the auctioned item will be sold regardless of price;
a reverse auction wherein multiple announcement distributors compete by offering progressively lower prices for at least one announcement;
a round robin auction wherein bidders submit bids prior to a deadline, receive notice of the highest bid, and are given a chance to outbid the highest bid;
a Walrasian auction, wherein the auctioneer takes bids from both buyers (e.g., the consumers (1-c) 102) and sellers (e.g., the merchants (1-m) 104) and concludes the auction when the supply and demand match;
a supply auction, wherein multiple seller sell bid items that a buyer requests;
a demand auction, wherein buyers bid for the bid item being sold;
a double auction, wherein multiple buyers bid for multiple bid items of multiple sellers;
an open auction, wherein bidders are aware of each other's bids and can each bid multiple times;
a closed auction, wherein bidders submit sealed bids;
a raffle, wherein bidders pay a set price for an opportunity to randomly win the auction; or
a combination of the forgoing.

At a step 406, at least one bid from at least one auction participant is received. For example, the acquirer (q) 204 may transmit an SMS text to the transaction handler (th) 206 via the Net (n) 108 including a monetary bid to receive an announcement containing data about the transaction history of the consumer (c) 102. In another example, the consumer (c) 102 may log onto an auction website using a desktop computer or the PCD of the consumer (c) 102 to bid on an announcement containing data about resources that had been previously sold at a store of the merchant (m) 104. The bid may offer currency, such as money or points, in exchange for the announcement opportunity. In the example above, the consumer (c) 102 may bid 1000 points for the announcement opportunity to receive the announcement containing data about the resources of the merchant (m) 104.

The users interested in participating in the auction (e.g., "auction participants", "bidders", "buyers", or "sellers") are each given a chance to place a bid for an announcement opportunity. In this case, the announcement opportunity being auction is the right to receive an announcement that consumers having gold cards are in a particular shopping. In this case, merchant (1) 104 and merchant (2) 104 may each be interested in receiving the announcement indicating when the consumers 102, having corresponding gold cards, have entered a mall that includes stores of merchant (1) 104 and merchant (2) 104. An auctioneer (e.g., the host (h) 106 or agent thereof) may auction the announcement opportunity to merchant (1) 104 and merchant (2) 104. If, for example, merchant (1) 104 wins the auction by having the highest monetary bid for the announcement opportunity, the auctioneer may send the announcement to merchant (1) 104 and but not to merchant (2) 104. Alternatively, the auction may have multiple winners such that each of merchant (1) 104 and merchant (2) 104 receive the announcement of the gold card shoppers being in the shopping mall.

The bidder may indicate who the bidder designates to be the announcement recipient of the announcement being auctioned. For example, the merchant (1) 104 may be interested in participating in an auction to have an offer of the merchant (1) 104 to be delivered to the consumer (c) 102 that is present in the spatial zone. If the merchant (1) 104 has the winning bid in the auction, the consumer (c) 102 will receive the offer of the merchant (1) 104 after the consumer (c) 102 enters the spatial zone.

At a step 408, a winning bid is selected based on at least one bid criterion. The bid criterion may be, for example: a required format for the bid (e.g., having a name of the bidder, a required deposit, receiving the bid within a window of time); a highest monetary offer among the corresponding monetary offers; a lowest monetary offer among the corresponding monetary offers; or a combination thereof. Different types of the auctions may have different winning bid criteria. To illustrate, in the reserve auction, one of the bid criterion may be that a currency amount of the winning bid must be higher than a preset price.

At a step 410, the auction participants, such as a subset of the users that submitted a corresponding bid, are notified about the results of the auction, such as being notified about a selection of a winning bid. For example, the transaction handler (th) 206 may post at an auction website that the auction has ended, wherein the auction participants can access the auction website and receive the posting. Alternatively, the host (h) 106 may send a notification to the winning bidders that each have won the auction to receive the announcement, which will be delivered after the announcement condition has been satisfied.

At a step 412, if the announcement condition is satisfied, the delivery of the announcement to the announcement recipient is facilitated. For example, after the announcement condition is satisfied, the host (h) 106 may transmit an e-mail containing the announcement to the designated announcement recipient.

The steps in FIGS. 3-4 may be conducted in any order and/or may be repeated several times. For example, the bid for the announcement opportunity to have the announcement delivered may be received (the step 406) prior to the step 304, wherein the data usable to determine that the announcement condition is satisfied is received. Alternatively, or in combination, the step 304 of receiving the data usable to determine that the condition is satisfied may be repeated several times prior to determining that the announcement condition is satisfied (the step 306).

The users of the announcement system 100 may receive reports. The reports may include, for example, a frequency of use of the announcement system 100, a number of times the announcement was sent to the announcement recipient, the number of times the announcement recipient responded to the announcement by sending a subsequent message through the announcement system 100, the bids submitted for the corresponding announcement opportunity, or data stored in the DB 110.

Exemplary Implementations

For exemplary purposes only, a number of implementations are described below. The announcement system 100 may be used to: announce the transaction history of the consumer (c) 102 to the users; announce or auction an announcement about the presence of the consumer (c) 102 in a spatial zone; announce the virtual presence of the consumer (c) 102 online and browsing one or more Internet websites in a defined group thereof; announce, to the merchant (m) 104, the actions of the consumer (c) 102 relative to a second, surrogate, merchant (m) 104; announce data about the past transactions of the merchant (m) 104 to the consumer (c) 102; or announce, to the consumer (c) 102, data about the transactions of other of the consumers 102 in a consumer group, for example.

Transaction History Announcement And Auction Example

In this example, users of announcement system 100 receive an announcement containing data about a transaction history of one of the accounts of consumer (1) 102 and can bid for an announcement opportunity to receive a second announcement containing the spend on a plurality of the accounts. For example, the consumer (1) 102 may have three (3) accounts within the payment processing system 200—a Wells Fargo® charge account, an M&I® debit account, and a Walgreens® gift account, each having a respective issuer (i) 202. Each of the issuers (i+1, i+2, and i+3) 202 may have specified to the transaction handler (th) 206 the announcement condition (the step 302) indicating an interest in receiving an announcement containing information about the spend on the three (3) accounts over a duration of time, such a month. The transaction handler (th) 206 may receive the transaction information for a plurality of transactions between the consumer (c) 102 and a plurality of merchants 104 upon the three (3) accounts (the step 306). At the end of a month, the transaction handler (th) 206 may calculate a spend of the consumer (1) 102 on each of the three accounts for the month (the step 304). The transaction handler (th) 206 may announce the spend on one of the accounts to the corresponding issuer (i) 202 (the step 312) while auctioning off, to each of the three issuers (i+1, i+2, and i+3) 202, the announcement opportunity to receive the information about the spend on all three (3) accounts (the step 410). Each of the three issuers (i+1, i+2, and i+3) 202 may electronically submit monetary bids for the announcement opportunity (the step 406) to the transaction handler (th) 206 via an interactive website where an open auction is conducted for the announcement opportunity to receive the full spend report. The transaction handler (th) 206 may select two winning bids having the top two monetary values (the step 408). The transaction handler (th) 206 may transmit a message via the Net (n) 108 to the winning bidders indicating that each has won the auction (the step 410). For example, the transaction handler (th) 206 may transmit the announcement including the information about the spend on the three accounts to each of the winning bidders by sending e-mails to the each of the winning bidders (the step 412). Each issuer (i) 202 having a respective winning bid may, in turn, take action on the received announcement, such as providing new account incentives to the consumer (1) 102 in order to shift more of the spend on each of the three accounts to the account that the respective issuer (i) 202 had previously issued to the consumer (1) 102.

Spatial Zone Triggered Announcement & Auction Example

In this example, several users of the announcement system specify corresponding announcement conditions, wherein delivery of a corresponding announcement is triggered by the presence of the consumer (c) 102 in a particular spatial zone. For example, four of the users may enroll in an announcement program of the transaction handler (th) 206. Each of the users may pay a subscription price to the transaction handler (th)

206 to be able to participate as one of the users in the announcement system 100. The users may include: a targeted consumer (1) 102 ("Sam"), a Starbucks® franchiser of Starbucks® coffee shops, a Wells Fargo® issued first account of Sam, and an M&I® issued second account of Sam, wherein each of the first and second accounts are associated with a respective RFID enabled PCD. One of the Starbucks® stores may install an RFID reader at its entrance that detects RFID enabled PCDs of consumers 102 as they enter the store.

Each of the users in the announcement system 100 may specify respective announcement conditions (the step 302). For example, the Starbucks® franchisor may create a profile at a website of the host (h) 106. The profile may include a tailored greeting message, updated intermittently, that the Starbucks® franchisor would like to be delivered to any consumer 102 in the announcement system 100 that (1) is moving in a target direction (e.g., toward one of the Starbucks® stores) and (2) has previously made a purchase from the Starbucks® store located in the target direction. The tailored greeting message may be, for example, "Hello [name of the any consumer (c) 102], should we prepare your usual [name the resource typically purchased a the Starbucks® store] before you arrive?" Similarly, the Wells Fargo® issuer and the M&I® issuer may each use the website to specify a respective announcement condition, such as, "send, to any consumer (c) 102 that has entered a spatial zone, an announcement including an offer of reward points if the corresponding consumer (c) 102 conducts a transaction on the account that we issued to the consumer (c) 102." The consumer (1) 102, "Sam", may also specify an announcement condition, wherein Sam specifies that Sam does not want to receive any announcements from the users of the announcement system 100 if the announcement is making an offer to Sam that is below a threshold of three hundred (300) loyalty points.

Sam may use a monthly train pass to enter a transit system to travel to his place of employment, where the place of employment and a Starbucks® store are each located within a specified spatial zone. The transaction handler (th) 206 may receive information from the transit system that can be used by the transaction handler (th) 206 to deduce that Sam has entered the transit system (the step 304). The transaction handler (th) 206 can also access the data stored in the DB 110 (e.g., the transaction history of the accounts issued to Sam) to determine that Sam typically purchases a latte hot drink from the Starbucks® store approximately thirty minutes after San enters the transit system. Consequently, the transaction handler (th) 206 can determine that the announcement condition of the Starbucks franchisor is satisfied because (1) Sam has moved in the direction of Starbucks® store (the step 306) and (2) Sam has previously purchased a latte at the Starbucks® store. The transaction handler (th) 206, upon satisfaction of this announcement condition, may send this tailored greeting message: "Hello Sam, should we prepare your usual latte before you arrive?", which message will be delivered to Sam in a pop up window rendered on a co-located cellular telephone known to be carried by Sam (the step 312). Sam may respond by selecting "yes" on the pop up window, for subsequent real time transmission from Sam's cellular telephone. The Starbucks® store can receive notice of Sam's interactively input choice by conventional means, such as by its receipt of an e-mail at an e-mail address associated with the Starbucks® store as was sent via the Net (n) 108. Moreover, the transaction handler (th) 206 may make the transaction for the latte payable upon one of Sam's accounts (e.g., either his Wells Fargo® account or his M&I® account). Therefore, Sam can simply enter the Starbucks® store, pick up and begin to enjoy his already-prepared and waiting latte, thereby avoiding waiting in line to order and/or pay.

Once Sam enters the Starbucks® store, its RFID reader at its entrance can read the account identifier of each of his first and the second accounts as are detected by Sam's respective co-located PCDs. This RFID reader may form a transmission for delivery to the transaction handler (th) 206 via the Net (n) 108. The transmission may include the account identifiers read by the RFID reader and location data usable to determine the location of the RFID reader (the step 304). The transaction handler (th) 206 may compare the account identifiers received in the transmission with account identifiers stored in the DB 110 to match the account identifiers with Sam's' first and second accounts which have already been associated with the announcement program. Moreover, the transaction handler (th) 206 may use the location data to determine the location the RFID reader, and compare the determined location with the spatial zone to find that Sam's' location is the same as the location of the RFID reader. In this manner, the transaction handler (th) 206 can determine that the announcement condition of each of the Wells Fargo® issuer and the M&I® issuer are satisfied (at the step 306).

Under the announcement program, the announcement opportunity to communicate with Sam may be auctioned to the issuers 202 in the announcement system 100. Each of the Wells Fargo® issuer and the M&I® issuer may receive the notification that the auction for the announcement opportunity to deliver an offer of reward points has begun (the step 404). Each of the Wells Fargo® issuer and the M&I® issuer may submit respective monetary bids to the transaction handler (th) 206. Here, the Wells Fargo® issuer may bid 500 loyalty points for a transaction on Sam's first account and the M&I® issuer may bid 200 loyalty points for a transaction on Sam's second account (the step 406). The transaction handler (th) 206 may use the bid criterion to determine the winner of the auction (the step 408). For example, the transaction handler (th) 206 may check both the value of the respective bids and an announcement condition previously specified by Sam to determine the winner of the auction. Here, Sam had the announcement condition that announcements offering below 300 loyalty point should not be sent to Sam. Given the bid amount and the announcement condition of Sam, in this example, the Wells Fargo® issuer would be deemed to be the winner of the auction. Sam may receive the announcement on his PCD including the offer of loyalty points of the Wells Fargo® issuer. The announcement, for instance, may be personalized based on the transaction information of Sam, such as: "if you purchase your usual latte with your Wells Fargo® account, Wells Fargo will give you 500 loyalty points toward your loyalty program" (the step 412). Sam may, but need not, confirm that the transaction should be conducted upon the Wells Fargo® account, such as by interactive use of a User Interface (UI) on Sam's PCD.

Any of the above three users may receive a report of announcements sent through the announcement system 100 dealing with the announcement program. For example, the M&I® issuer may be notified about why it did not win the auction, the Wells Fargo® issuer may receive a report on how many of the announcements were sent to consumers 102 that met the announcement condition of the Wells Fargo® issuer; the Starbucks® franchiser may receive a report on how sales have increased or decreased after the tailored greeting messages were sent as determined from the transaction information of the Starbucks® store stored in the DB 110 for the consumers 102 that received the announcements including the corresponding greeting messages; or Sam may receive a report on how many of the announcements were blocked given his announcement condition, for example.

Internet Zone Announcement

Here, the announcement recipient receives the announcement that is triggered by the presence of the consumer (c) 102 in an Internet Zone. For example, the merchant (m) 104, a manufacturer of power tools, may access an interactive website of the host (h) 106 to specify the announcement condition "send me an email when any [consumer 102] between the ages of 30-60 years (the targeted consumer (c) 102) conducts an on-line purchase of the resources of a home improvement retailer" (the step 302). The transaction handler (th) 206 may receive an authorization request for an on-line transaction via the Net (n) 108 (the step 304), wherein the authorization request includes an account identifier and a code indicating that it is an on-line transaction. The transaction handler (th) 206 may forward the authorization request to the corresponding issuer (i) 202 of the account identified in the authorization request. The transaction handler (th) 206 may also use the transaction information in the authorization request to determine whether the announcement condition has been satisfied (the step 306). The transaction handler (th) 206 may determine that the announcement condition is satisfied by: (1) comparing the merchant identifier of the merchant (m) 104 that was received in the authorization request with the merchant identifier of "home improvement retailers;" (2) using the received code to determine that the transaction was conducted on-line; (3) using the received account identifier to retrieve from the DB 110 the age of the consumer (c) 102 engaged in the on-line transaction; and (4) comparing the retrieved age with the age range 30-40 criterion to find a match. If a match exits, the transaction handler (th) 206 may send an e-mail about the on-line transaction to the manufacturer of the power tools (the step 312).

Targeting Merchant (m) 104 Announcement Example

In this example, consumer (c) 102 receives an announcement that is triggered based on the actions of the consumer (c) 102 with a surrogate merchant (m) 104. The announcement may contain information about a targeting merchant (m) 104 that is different from the surrogate merchant (m) 104. The surrogate merchant (m) 104 can be, for example: a competitor of the targeting merchant (m) 104; one of the merchants 104 that is in the zone of interest to the targeting merchant (m) 104; one of the merchants 104 that has a contractual agreement to help market the resources of the targeting merchant (m) 104; one of the merchants 104 whose transactions tend to occur within a temporal proximity of the transactions of the targeting merchant (m) 104; or one of the merchants 104 whose resources are utilized within a temporal proximity of the transactions of the targeting merchant (m) 104. Temporal proximity can be a time span from instantly, immediately, or in real time to a time span that is less than seven (7) days, for example.

In one implementation, the announcement condition may be based on occurrence of the transaction between the consumer (c) 102 and the surrogate merchant (m) 104. As stated previously, the targeting merchant (m) 104 may specify the announcement condition (the step 302) as a purchase by the consumer (c) 102 from the surrogate merchant (m) 104. The targeting merchant (m) 104 may select the surrogate merchant (m) 104 by name (e.g., "a Wal-Mart® store located on 5th Ave"), a category ("clothing retailer"), or location (e.g., "the Mills Mall"), for example. The announcement condition can further delineate: the type of the consumers 102 that are targeted (e.g., "Sally Smith," "those consumers 102 that frequently shop with me," or "gold card members") or other parameters such as the purchase amount (e.g., purchases that are over $100 US). The targeting merchant (m) 104 may also specify the announcement recipient to be the consumer (c) 102 that has engaged in the transaction with the surrogate merchant (m) 104 and/or the targeting merchant (m) 104. An algorithmic rule can be created based on the announcement condition of the targeting merchant (m) 104.

The host (h) 106 may determine if the announcement condition is satisfied by use of hardware executing an algorithm or software that determines if a transaction has occurred with the surrogate merchant (m) 104. For example, the transaction handler (th) 206 may determine if the announcement condition is satisfied by using an algorithm to distinguished the transaction of the surrogate merchant (m) 104 from among the plurality of received transactions and to analyze the corresponding received transaction information, such as by comparing the corresponding received transaction information with the data stored in the DB 110. For example, the transaction handler (th) 206 may execute the algorithm that finds matches between the merchant identifier of the merchant (m) 104 engaged in the distinguished transaction and the merchant identifier of the surrogate merchant (m) 104 selected by the targeting merchant (m) 104.

As stated previously, the match may be of respective merchant categories derived from the corresponding merchant identifiers. For example, the transaction handler (th) 206 may use the merchant identifier of the merchant (m) 104 engaged in the corresponding transaction to determine a category of the respective merchant (m) 104 (e.g., clothing retailer). The determined category can be compared with the category of the surrogate merchant (m) 104 selected by the targeting merchant (m) 104 (e.g., women's clothing retailer) to find a match. The matching does not have to be exact. Rather, the algorithm may have matching rules that dictate the degree to which comparisons are deemed to be a match. Thereafter, if a match is deemed to exist, the announcement condition is considered satisfied and the announcement is sent to the announcement recipient.

To illustrate, the targeting merchant (m) 104 may be a Target® store and the surrogate merchant (m) 104 may be a Wal-Mart® store, a competitor of the Target® store. When the consumer (1) 102, Sally Smith, makes a purchase at the Wal-Mart® store, the transaction handler (th) 206 receives the transaction information, routes the purchase to the corresponding issuer (i) 202 of the account of Sally Smith, uses the merchant identifier in the transaction to match the Wal-Mart® store with the surrogate merchant (m) 104 in the announcement program, and sends the announcement to the Target® store, such as, "Sally Smith just bought a pair of scissors at the Wal-Mart® store." Thereafter, the consumer (c) 102, Sally Smith, may receive this text message on her cellular telephone: "scissors are on sale at Target for $20 US."

As stated previously, the surrogate merchant (m) 104 may be one of the merchants 104 whose transactions occur within a temporal proximity with those of the targeting merchant (m) 104. The transaction information for the plurality of transactions between the merchants 104 and the consumers 102 may indicate that the consumers 102 that shop with the surrogate merchant (m) 104 also tend to shop with the targeting merchant (m) 104 within a window of time from the purchase at the surrogate merchant (m) 104. For example, those consumers 102 that engage in the transactions upon corresponding accounts with a Neiman Marcus® store in a mall also tend to purchase coffee about an hour later from the Starbucks® store in the mall using the same respective account. Stated otherwise, the consumer may have made a purchase in the past from a surrogate merchant and, within a window of time, made another purchase from a targeting merchant. As such, the targeting merchant will want to send its announcement to the consumer within the same window of time (e.g., between the minimum and maximum windows of time) after the consumer makes a subsequent purchase from the surrogate merchant. As such, the targeting merchant is acting on the believe that its announcement will cause the consumer to repeat prior behavior by making yet another purchase at the targeting merchant within the same window of time after the subsequent purchase from the surrogate merchant. Satisfaction of the announcement condition may include passage of approximately the window of time prior to sending the announcement. Similarly, a history of other consumers making chronologically sequential purchases at a surrogate merchant and a targeting merchant can be used to derive a minimum and maximum window of time during which an announcement from the targeting merchant should be sent to any consumer detected to be proximal the surrogate merchant such that the detected consumer will be most likely to act upon the received announcement.

The announcement can be sent to a point of service terminal of the surrogate merchant, to a portable consumer device co-located with the consumer, or to both.

In one implementation, the corresponding account identifiers of the consumers 102 are used to analyze temporal or sequential shopping trends of the consumers 102 based on the data in the DB 110 and/or data in the received transaction information (e.g., data that is received in real-time). The determined shopping trend can then guide the announcement condition. For example, the transaction handler (th) 206 may determine that, within an average of about two hours, 51% of the account identifiers used in the transactions with the Neiman Marcus® store are also used for the transactions with the Starbucks® store. Therefore, announcements can be sent to those consumers 102 that have already shopped with either Neiman Marcus or Starbucks. Offer made in the announcements will be more likely to be effective if they are sent within the two hour window of time described above.

The window of time may be based on the purchasing behavior of a single consumer (1) 102 or on a plurality of the consumers 102. For example, a time lapse can be determined for a sequence of transactions of the consumer (1) 102 with each of the surrogate merchant (1) 104 and the targeting merchant (2) 104. The determined time lapse can then be considered the window of time. Alternatively, a corresponding time lapse can be calculated for each of the plurality of the consumers 102 and algorithmically combined to determine the window of time. For example, the window of time may be the average of the three time lapses for three consumers (c+1, c+2, c+3) 102 (e.g., 1.0 hour, 1.5 hours, and 2 hours=1.5 hours).

The announcement may be sent to the announcement recipient within the temporal proximity (e.g., the window of time) after the satisfaction of the announcement condition, which is the receipt of a subsequent transaction of the consumer (c) 102 with the surrogate merchant (m) 104 in this example. For example, the transaction handler (th) 206 may calculate the window of time based on the past transactions of the consumer (1) 102 with each of the surrogate and the targeting merchants (m) 104 to be one hour. The transaction handler (th) 206 may receive a subsequent authorization request addressed from the surrogate merchant (m) 104. The transaction handler (th) 206 may determine that the announcement condition is satisfied and send the announcement to the announcement recipient within the hour after receiving the subsequent authorization request. In this manner, the announcement, such as a coupon, can be sent to the consumer (c) 102 at an opportune time. For example, the transaction information of Sally Smith may show that, for about 70% of the time, Sally Smith purchases a coffee at the Starbucks® store within a hour of shopping at the Neiman Marcus® store. The next time Sally Smith makes a purchase at the Neiman Marcus® store, Sally Smith may receive a Starbucks® coupon, or that of a Starbuck's competitor, within an hour of shopping at the Neiman Marcus® store. Sally Smith may receive the Starbucks® coupon nearly instantaneously, such as on the back of the receipt of the subsequent transaction with the Neiman Marcus® store. Similarly, the Starbucks® coupon may be rendering on the PCD of Sally Smith as she is walking out of, and toward, the Starbucks® store, for example.

The temporal proximity may be between the utilization of the resources of the surrogate merchant (m) 104 and the transaction of the targeting merchant (m) 104. To illustrate, the transaction handler (th) 206 may determine, based on the data stored in the DB 110, that 80% of the consumers 102 that purchase a Mediterranean cruise trip tend to shop at harbor stores after commencement of the Mediterranean cruise trip. The transaction handler (th) 206 may communicate the trend analysis to the targeting merchant (m) 104. The targeting merchant (m) 104 may then specify the announcement condition based on the received trend analysis. For example, the targeting merchant (m) 104 may specify the announcement condition as "if the consumer (c) 102 has purchased a ticket on a Mediterranean cruise, then send an announcement to the consumer (c) 102 on the date that the cruise line docks at the harbor near the targeting merchant (m) 104" (the step 302). The transaction handler (th) 206 may receive the transaction information indicating that a targeted consumer (c) 102 has purchased a ticket on a Mediterranean cruise that will commence in July of 2008 (the step 304). The transaction handler (th) 206 may further use the data stored in the DB 110 to determine that the consumers 102 that purchased Mediterranean cruises booked for July 1st tend to purchase resources from harbor stores located in the spatial zone on July 15th (the step 306). The transaction handler (th) 206 may send the announcement to the targeted consumer (c) 102 on Jul. 15, 2008 (the step 306 and the step 312).

In yet another example, the announcement condition may be based on the real time spatial proximity of the consumer (c) 102 to the location of the surrogate merchant (m) 104. In the example above, the surrogate merchant (m) 104 may be the Neiman Marcus® store but the sending of the announcement may be triggered by the presence of the consumer (c) 102 near the Neiman Marcus® store; therefore, a transaction with the Neiman Marcus® store is not necessary. The presence of the consumer (c) 102 may be determined via a signal received from a co-located PCD, as previously described. Therefore, if the determined shopping trend shows that most of the consumers 102 that shop at the Neiman Marcus® store also tend to shop at the Starbucks® store, then the consumer (c) 102 that is near the Neiman Marcus® store may receive the Starbucks® coupon, or that of an identified competitor, even without purchasing resources at the Neiman Marcus® store. Therefore, the consumer (c) 102 need not engage in the subsequent transaction with the Neiman Marcus® store in order to trigger the receipt of the announcement containing the coupon of the targeting merchant (m) 104.

Alternatively, or in combination, the criterion of the announcement condition may be based on other shopping behaviors, such as: a relationship between the resources purchased from the surrogate merchant (m) 104 and the resources offered by the targeting merchant (m) 104 (e.g., shoes and socks, iPod® music player and iTunes® digital music, hamburger at a supermarket and George Forman® grill at a nearby retail appliance store); a relationship between the surrogate merchants 104 and the targeting merchant (m) 104 (e.g. a loyalty program giving points for purchases with either of two merchants (m+1, M+2) 104); or a relationship between consumers 102 (e.g., similar purchasing behaviors among members of a household or friends). Other criterion based on purchasing behaviors are also applicable.

In some implementations, the targeting merchant (1) 104 may pay a fee to the surrogate merchant (2) 104 for information about the transactions with the targeting merchant (1) 104 that arise as a result of the announcement being sent to the consumer (c) 102. For example, both the surrogate merchant (2) 104 and the targeting merchant (1) 104 may participate in the announcement program wherein each gives consent to the host (h) 106 to the use the transaction information corresponding to the respective merchant (m+1, m+2) 104 in the announcement program. Thereafter, if the consumer (c) 102 that received the announcement engages in the transaction with the targeting merchant (1) 104, then the targeting merchant (1) 104 would pay a fee to the surrogate merchant (2) 104 (2% of the purchase price).

Announcement about a Targeted Merchant Example

Typically, the consumer (c) 102 has access to little information about past sales of the merchant (m) 104, although the consumer (c) 102 may know the name and location (physical address or URL address) of the merchant (m) 104 and a current advertised price for a particular resource that is sold by the merchant (m) 104. Typically, the consumer (c) 102 does not have access to merchant information about the merchant (m) 104, such as: a past price of the particular resource, a sales volume of the merchant (m) 104 over a period of time, the frequency of the transactions with the merchant (m) 104 for the particular resource, whether a particular one of the consumers 102 (e.g., an identified friend, relative, or celebrity) has engaged in the transaction with the merchant (m) 104. In some instances, the merchant (m) 104 may advertise portions of a merchant information, such as the past price, but the consumer (c) 102 has no direct way to confirm the accuracy of the advertisement. For example, the merchant (m) 104 may advertise that Prada® hand bags were sold for $5000 US last week but they are on sale for $100 US this week. Currently, the consumer (c) 102 is not able to verify that the Prada® hand bags were, in fact, sold at the store of the merchant (m) 104 for $5000 US last week.

In one implementation, a shopper (e.g., the consumer (c) 102) receives an announcement, which includes information about past transactions of merchant (m) 104. An announcement distributor may have a shopper announcement program wherein shoppers that are eligible as announcement recipients can receive information about the past transactions of the merchant (m) 104.

The announcement distributor, the merchant (m) 104, or the announcement recipient may specify the content of the announcement (the step 308). For example, the merchant (m) 104 may: delineate the types of merchant information about the merchant (m) 104 that the announcement distributor may distribute to the announcement recipients. To illustrate, the merchant (m) 104 may delineate that the announcement content be limited to the transaction information of the merchant (m) 104 for resources having a high volume of sales over the past three months. The shopper interested in the shopper announcement program may pay a different fee for various levels of access to the merchant information.

Consumer (c) 102 may transmit a query (i.e., a request) to an announcement distributor, such as a transmission requesting information about merchant (m) 104 or multiple merchants 104. The announcement distributor may receive the query and determine if the announcement condition is satisfied (step 306 in FIG. 3), for example, by determining: (i) that consumer (c) 102 is one of the shoppers registered for the shopper announcement program; or (ii) that the query was submitted to the announcement distributor within the hours of operation of the announcement program. The announcement distributor may further determine if it has the proper authority or required consent(s) to distribute the announcement to the shopper by, for example, determining if local laws allow for distribution of the merchant information (the step 308). After the announcement condition is determined to be satisfied (the step 306), the announcement distributor may facilitate the delivery of the announcement to the shopper, such as by forming a transmission, addressed to the shopper and including a response to the query (the step 312).

In one implementation, the response to the request (e.g., query) of the shopper may be based on data stored in the DB 110 or on transaction information as the transactions are being processed in the payment processing system 200. To illustrate, consumer (c) 102, when determined to be present in a particular spatial zone, may ask transaction handler (th) 206 to transmit the price of Prada® hand bags that have been sold within the past week at stores located in the spatial zone, such as those sold by a Neiman Marcus® store located in the spatial zone. The transaction handler (th) 206 may determine that the announcement condition is satisfied by determining if the consumer (c) 102 is an eligible announcement recipient in the shopper announcement program (the step 306). Thereafter, the transaction handler (th) 206 may prepare the content of the announcement by: determining a merchant identifier for the Neiman Marcus® store located in the spatial zone; accessing the DB 110 to retrieve the merchant information about the Neiman Marcus® store that is located in the spatial zone; and determining, from the retrieved merchant information, the price of all Prada® hand bags sold at the Neiman Marcus® store in the past week. The transaction handler (th) 206 may, in turn, form the announcement for transmission, including the determined price of the Prada® hand bags sold at the Neiman Marcus® store in the past week. Alternatively, or in a combination of the forgoing, the transaction handler (th) 206 may: determine which stores are located in the spatial zone (e.g. by comparing the spatial zone to the known locations of a plurality of the merchants 104) and determine the price of the Prada® hand bags sold within the past week at each of the stores located in the spatial zone. The transaction handler (th) 206 may, in turn, respond to the shopper by sending the announcement to the shopper who had made the request (the step 312).

The announcement system 100 may be used for any number of shopper requests. Examples of requests may include: a price paid for a resource; a confirmation that a current advertised price for the resource is less than the price paid for the resource in a past transaction; an average sales volume of each of two adjacent stores, such as when the shopper is looking to make a purchase at one of the adjacent stores; a frequency of sale of a specified resource (e.g., to determine how rare the availability of the resource may be); a degree of fluctuation of prices at the merchant (m) 104 (e.g., to determine the likelihood that a resource will be at a different price in the near future); a frequency of co-purchasing of two resources at the merchant (m) 104 (e.g., to determine if one resource is typically purchased with the other resource); a rate at which resources are returned to the merchant (m) 104 (e.g., to determine the quality of the resources being sold at the merchant (m) 104); a transaction that used a loyalty redemption for the purchase of a resource from merchant (m) 104 or of loyalty awards (e.g., to determine if merchant (m) 104 accepts points as currency for a purchase or to determine if transactions with the merchant (m) 104 have resulted in loyalty points that the consumer (c) 102 may also be eligible for); or a query asking if a specified shopper has engaged in a transaction with the merchant (m) 104 in the past (e.g., to determine if a friend likes to shop at the merchant (m) 104 or whether a celebrity frequents a store of the merchant (m) 104).

Announcement about Member Consumer Transactions Examples

In these examples, a member consumer (e.g., the consumers 102) of a consumer group can be an announcement recipient who will receive an announcement containing data about past transactions of other member consumers in the consumer group even if the announcement recipient is not an account holder having an account upon which any of those past transactions was conducted. For example, a first member consumer may receive the transaction information of a second member consumer even if the first member consumer is not an account holder of the account of the second member consumer. In summary, the member consumers in the consumer group agree to share at least portions of their respective transaction histories with one another.

The member consumers can delineate the types of information that can be shared. For example, the member consumers may limit access of other member consumers to data about the manufacturers of the resources that they purchased or to the purchase prices they paid for the resources they purchased. Moreover, each member consumer may customize a type of their purchasing information that they are willing to share according to a type of member consumer in the consumer group. For instance, a member consumer can specify other member consumers in the consumer group as being a family member, a friend, or a non-acquaintance. To illustrate, if a member consumer identifies three other member consumers as being two sisters and a friend, then the two sisters will have greater access to the member consumer's transaction information than would the friend. For example, the two sisters may each receive an announcement as to the name brand, manufacturer, and price of a resource purchased by the consumer member, whereas the friend would receive an announcement containing only the manufacturer's name of the purchased resource.

Examples illustrating the purpose and usefulness of receiving announcements about past and present transactions of the member consumers in a consumer group include: receiving ads or offers for resources that are likely to be of interest to consumers (c) 102 in the consumer group; receiving announcements that recommend a resource or a merchant (m) 104 to other member consumers; receiving an announcement containing a purchase "wish list" of a member consumer; receiving an offers for a resource at a purchase price that is made available to any other member consumer in the consumer group; receiving an announcement about a gift concierge service available to the consumer group; receiving an announcement that one member consumer can pay for part of a purchase by another member consumer; receiving an announcement as that a celebrity has endorsed a resource, where the announcement can be sent or received by one or more member consumers, a merchant (m) 104, an issuer (i) 202, an acquirer (q) 204, a transaction handler (th) 206, or an agent of any of the foregoing.

In one implementation, a request can be received from a member consumer about transactions upon accounts of other member consumer(s), where the query will be understood by an announcement distributor, or agent thereof, to be a criterion of an announcement condition the satisfaction of which will trigger an announcement being sent to the requesting member consumer. For example, the announcement sent to member consumers may include data such as: the identity of one of the member consumers; the merchant identifier of the merchant (m) 104 that sold a specified resource to one of the member consumers; an offer of the merchant (m) 104 to one of the member consumers; an average spend of one of the member consumers; a resource identifier of one of the resources purchased in the past by one of the member consumers; the resource identifier of at least one resource that none of the member consumers has purchased within a specified window of time; the resource identifier of at least one resource that is predicted to be of interest to at least one of the member consumers based on the resources purchased in the past by the member consumers; the resource identifier of at least one resource within a pre-selected resource set including resources of interest to the member consumers; or a manufacturer identifier of at least one resource purchased by one of the member consumers.

In another implementation, an announcement condition may be based on criteria selected by the member consumers, such as the purchase of a resource that is of interest to at least one of the member consumers. The member consumers may have a set of resources ("resource set") that is of interest to the member consumers. The announcement condition may be a change that occurs to the resource set as member consumers engage in transactions for the resources in the resource set with various merchants 104, such as a shopping "wishlist" that is tracked across the merchants 104. In another example, the member consumers may receive the announcement when one of the member consumers is present in a particular spatial zone, the announcement include one or more merchants 104 that are in that zone and can engage in a transaction for a resource that is in the resource set.

Figure 5:
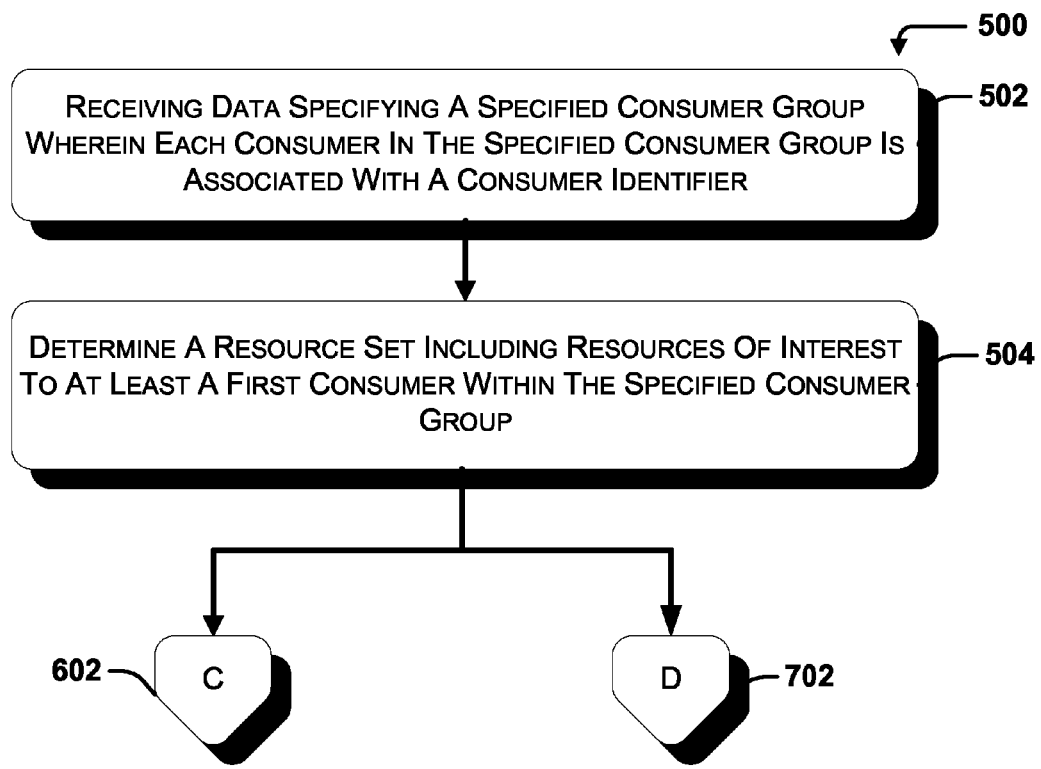
FIG. 5 depicts a flowchart of an exemplary method, that can be performed in the environment of FIG. 1, for notifying a member consumer in a consumer group of purchases from any of a plurality of the merchants that are made by any other member consumer in the consumer group.

Referring to FIG. 5, a flowchart depicts an exemplary method 500 for notifying a member consumer of transactions ("purchases") made by other member consumers in a consumer group from a plurality of merchants 104. At a step 502, data specifying the consumer group is received. The data specifying the consumer group may include corresponding consumer identifiers usable to distinguish or identify the respective member consumers from other consumers 102 within the payment processing system 200. For example, the consumer identifier may be a legal name or other distinguishing title of the member consumer. Alternatively, or in combination of the foregoing, the consumer identifier may be: an account number of an account of consumer (c) 102 who is also a member consumer in the consumer group; a telephone number of the member consumer; a random number assigned to the member consumer; a Personal Identification Number (PIN); or a digital recording of a voice of the member consumer from which the member consumer can be identified. Other forms of the consumer identifier, as are known by those of ordinary skill in the relevant art, can also suffice to distinguish the member consumer from among the other consumers 102 that are, or are not, in the consumer group.

The consumer (c) 102 may make a selection from among other member consumers in a consumer group to form a subgroup. For example, consumer (c) 102, Sally Smith, may access an Internet website via a web enabled cellular telephone. Sally Smith may enter consumer group data during an interactive session with the website wherein Sally Smith selects three friends (consumer (c+1, c+2, c+3) 102) with whom she wants to share data about her transactions within the payment processing system 200. To make selections, consumer (c) 102 may have access through the website to consumer group data that may include data about the member consumers such as: a name of the member consumer, a consumer identifier for each member consumer, an account identifier of an account of a member consumer, an demographic of a member consumer, or the marital status of a member consumer. Once entered, the member consumer data may be stored in the DB 110 in association with the consumer group. Optionally, each of the friends may receive a transmission seeking their respective consents to be one of the member consumers or requesting other information from the member consumers, such as their account identifier.

At a step 504, a resource set is determined. This resource set may include the resources that are of interest to at least one member consumer in the consumer group. The resource set can be specified or predicted. In one implementation, at least one of the member consumers specifies at least one of the resources of interest. To illustrate, Sally Smith may specify an interest in a pair of Manolo® shoes and an IBM Thinkpad® computer, each of which is included in a resource set stored in the DB 110 in association with the consumer group. Moreover, any of Sally's three specified friends may log onto the website linked to the DB 110 and further add or delete resources in the resource set. For example, one of Sally's friends may add peaches to the resource set. Therefore, the composition of resources in the resource set may be negotiated among the member consumers, wherein some member consumers propose that a resource be included in the resource set while others respond to the proposal until an agreement is reached as to a final composition of resources in the resource set.

Alternatively, or in a combination of the foregoing, the resource set may be predicted based on the past transaction histories of each of the member consumers. In one implementation, the transaction handler (th) 206 uses an algorithm to determine transaction trends within the transaction histories of corresponding member consumers to predict the resource set. For example, the transaction history of the accounts of Sally Smith and her three (3) friends may show a trend of conducting transactions with Macy's® department stores. Consequently, the resource set may include the predicted trend: "Macy's® department store."

Figure 6:
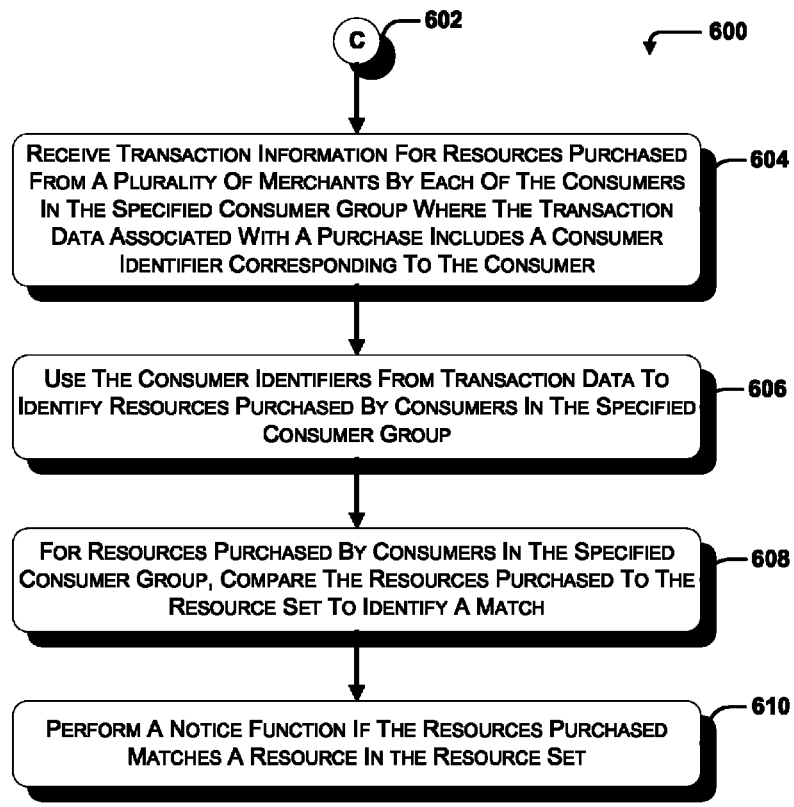
FIG. 6 continues the flowchart in FIG. 5, wherein the announcement is triggered by one of the member consumers engaging in a transaction.

If the announcement condition is based on receiving a transaction of one of the member consumers for the purchase of a resource in the resource set, then the method 500 moves from the step 504 to a step 604 in FIG. 6. Alternatively, or in a combination of the forgoing, if the announcement condition is based on the presence of the member consumer in a particular spatial zone, the method 500 moves from a step 504 to a step 702 in FIG. 7.

At the step 604, the transaction information is received about the transactions between the merchants 104 and the consumers 102, which may include the member consumers. As previously described, the transaction information may include a resource identifier (e.g., Universal Product Code (UPC), Stock Keeping Unit (SKU) or resource description) and the consumer identifier of the corresponding consumer (c) 102.

At a step 606, the transactions of the member consumers are distinguished from among the transactions of the plurality of the consumers 102. For example, the consumer identifier in the transaction information is compared with the corresponding consumer identifier of the member consumers to find a match. In the above illustration, Sally Smith may have associated a first account number of her account with the consumer group in which is she is one of the member consumers. When Sally Smith engages in the transaction upon that account, the merchant (m) 104 may submit an authorization request including the first account number. The transaction handler (th) 206 may receive the authorization request within the payment processing system 200. The transaction handler (th) 206 may, in turn, match the first account number received in the authorization request with the first account number stored in the DB 110 in association with Sally Smith as one of the member consumers of the consumer group. At a step 608, the resources purchased by member consumers are compared to the resources in the resource set to determine a match. For example, the transaction handler (th) 206 may match data about the resource purchased in the received authorization request with the resources in the resource set.

Not all transactions within the payment processing system 200 of the member consumers need to be compared against the resource set. The member consumers may provide to the host (h) 106 an inclusion indicator. The host (h) 106 can use this inclusion indicator to select those transactions of member consumers that should be compared against the resource set. For example, the member consumer may set up rules that denote which of their transactions in the payment processing system 200 should be compared with data associated with the consumer group. To illustrate, the profile associated with the consumer group may indicate that only transactions with specified merchants 104 should be compared against the resource set, or that only transactions that are conducted on specified accounts should be compared against the resource set. Other means for distinguishing the transactions of the member consumers by comparing data associated with the consumer group include: matching a consumer group code (e.g., PIN) that the member consumer enters during the transaction with the consumer group code associated with the consumer group in the DB 110; using a query response session during the transaction to obtain from the member consumer information to be compared to data associates with the consumer group; or providing consumer members of the consumer group with a pseudo account number for use in their transactions. For example, the member consumer may enter a special code into a Point of Service terminal (POS) of the merchant (m) 104 during a transaction that indicates that information obtained from the transaction should be compared to the data associated with the consumer group.

The pseudo account number may be linked with respective accounts of each member consumer within the payment processing system 200. For example, each of the member consumers may receive a corresponding PCD specific to the consumer group, such as a payment card that is associated with or otherwise identifies the pseudo account number. When the member consumer conducts a transaction on the pseudo account number, the transaction is sent to the transaction handler (th) 206 that recognizes the pseudo account number, routes the transaction to the corresponding account of the member consumer that is linked to the pseudo account number, and compares data from the transaction with the data associated with the consumer group. Other techniques effective to distinguish the transactions of the member consumers are also contemplated for use in the disclosed implementations.

At a step 610, a notice function is performed if the resources purchased match the resources in the resource set. The notice function may include sending the announcement to the member consumer. The announcement may include information such as: a purchase price of the matched resource; a time that the matched resource was purchased; the consumer identifier (e.g., a name of the member consumer that purchased the matched resource); a date that the matched resource was purchased; a resource identifier of the matched resource; a manufacturer identifier of the matched resource; a message from one of the member consumers; information about a location of one of the member consumers; an offer of the merchant (m) 104 for the resource sold to one of the member consumers; an average purchase amount of one of the resources purchased by the member consumers; the resource identifier of a resource that none of the member consumers has purchased within a specified window of time; the resource identifier of one of the resources in the predicted or selected resource set; or an alert that payment processing system 200 has received an authorization request a transaction to purchase of one of the resources of interest. To illustrate, if Sally Smith purchases the peaches, which resource is matched in the resource set, then the announcement may be sent to one of her three friends with the included text: "The peaches from your resource set have just been purchased."

The resource set may be changed or updated based on the comparison between the resources in the resource set and the resources purchased by the member consumers. For example, resources in the resource set may be removed as member consumers purchase them or added as the resource set is predicted based on the transaction history of the member consumers. For example, if a resource set consists of mutually exclusive wedding gifts to be purchased by member consumers in a consumer group, each purchase of each gift removes a resource in the resource set until all of the wedding gifts have been purchased and the resource set is devoid of resources.

Each member consumer may receive an announcement that includes information about the resource set that is of interest specifically to them. In one implementation, a subset of the predicted resource set is determined and included in the announcement to a first member consumer. The subset may be based on the transaction history of the first member consumer. For example, the resource set may include a Rolex® watch, a Cadillac® vehicle, peaches, and an Apple® iPod® music player. The transaction history of the first member consumer, Sally Smith, may show that Sally Smith typically makes purchases in a range of $1 US to $1000 US. Therefore, the announcement sent to Sally Smith may only include information about the resources that have a purchase price in this range, such as the peaches and the Apple® iPod® music player. In another example, if the transaction history for Sally shows that she has already bought the resource in the resource set, she will not receive the announcement about that resource. For example, if the resource set includes a Spaghetti lunch at Cibo™ restaurant, but the transaction history of Sally Smith shows that Sally Smith has already eaten there this week, then Sally Smith won't receive the announcement including a coupon for the Spaghetti lunch at Cibo™ restaurant, while the other member consumers may receive the coupon. Similarly, individual member consumers can opt-in or out of receiving selected announcements.

Figure 7:
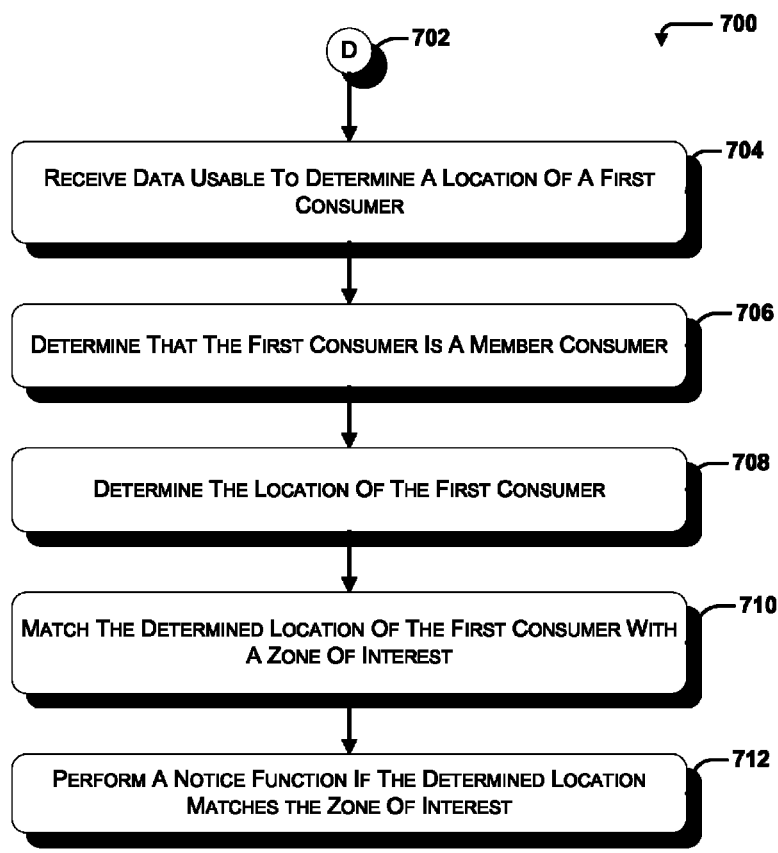
FIG. 7 continues the flowchart in FIG. 5, wherein the announcement is triggered by the presence of one of the member consumers in a zone.

In another implementation, the announcement condition may be based on the presence of the member consumer in a specified spatial zone, in which case, the method 500 moves from a step 504 to a step 702 in FIG. 7. At a step 704, data usable to determine a location of a first consumer (c) 102 is received. As previously described, a co-located PCD can transmit information from which a location of the consumer (c) 102 to the host (h) 106. At a step 706, a determination is made as to whether the first consumer (c) 102 is one of the member consumers of the consumer group. For example, if the received data in the step 704 includes the consumer identifier of the first consumer (c) 102 (e.g., an account number or telephone number associated with the first consumer (c) 102), then the received consumer identifier is compared against the consumer identifiers stored in the DB 110 in association with the consumer group.

At a step 708, the location of the first consumer (c) 102 is determined from the transmitted information. For example, the host (h) 106 (e.g., the transaction handler (th) 206) may receive a transmission that includes GPS or local area network coordinates from which the location of the first consumer (c) 102 can be determined. The host (h) 106, may translate the coordinates into a physical address, such as a street address. At a step 710, the determined location of the first consumer is matched with the zone of interest. For example, the determined street address of the first consumer (c) 102 may be compared to the geographic boundaries of the spatial zone to determine if the first consumer (c) 102 is located within the spatial zone.

At a step 712, a notice function is performed if the determined location of the first consumer (c) 102 matches the zone of interest. The notice function may including forming the announcement for delivery to one of the member consumers including information about potential purchasing announcement opportunities. For example, Sally Smith is determined to be in the spatial zone that includes the merchant (m) 104 who can sell the IBM ThinkPad® computer which is one of the resources in the resource set. The notice function may be a transmission of a message to Sally Smith's cellular telephone that the merchant (m) 104 is selling the IBM ThinkPad® computer. Alternatively, or in combination, one of Sally's friends in the consumer group may receive the announcement indicating that Sally is near the merchant (m) 104 who is sells the IBM ThinkPad® computer. Thereafter, one of her friends may call Sally Smith to pass on the information about the merchant (m) 104.

Other implementations of the "Announcement About Member Consumer Transactions Examples" are described below including: (a) Wishlist, (b) Common Purchase Price (c) Automated Gift Concierge, (d) Pooled Money, and (e) Celebrity Endorsement.

(a) Wishlist

The announcement system 100 may be used to create a wishlist (e.g., resource set) of resources that the consumer (c) 102 is interested in. The consumer (c) 102 can create a consumer group (the step 502), including denoting the member consumers in the consumer group. Each of the member consumers may have access to the wishlist which includes resources that may be purchased from any of a number of the merchants 104 (the step 504). The wishlist is edited or updated as the member consumers make purchases of resources on the wish list using any of a number of the accounts that are associated with the consumer group. For example, the wishlist may include a Microsoft® Xbox and a toy train. The transaction handler (th) 206 may receive a transaction from a first merchant (m) 104 for the Microsoft® Xbox, where the transaction was conducted upon one of the accounts associated with the consumer group (the step 604). The transaction handler (th) 206 may: identify the Microsoft® Xbox as one of the resources in the resource set (the step 608), remove the Microsoft® Xbox from the wishlist and inform the member consumers that the Microsoft® Xbox is no longer on the wishlist (the step 610). Similarly, if one of the member consumers is determined to be near a toy shop selling toy trains (the steps 704, 706, 708, and 710), the transaction handler (th) 206 can facilitate the delivery of a notice to the member consumer near the toy shop that the toy train may be purchased at the toy shop (the step 712).

(b) Common Purchase Price

The announcement system 100 may be used to offer resources to the member consumer at a purchase price that is similar to the purchase price paid by another member consumer. Here, the member consumers may create the resource set that includes resources that a plurality of the member consumers are interested in purchasing (the steps 502 and 504). The announcement condition can be selected to be the purchase of one of the resources in the resource set by one of the member consumers. The host (h) 106 may receive the plurality of transactions (the step 604) and distinguish the transactions of the member consumer(s) with the merchant (m) 104 for the resource in the resource set (the steps 606, and 608)), and facilitate the sending of the announcement to the other member consumers (the step 610). The announcement may include information such as the purchase price of the purchased resource, the name of the member consumer that purchased the resource, or a description of the merchant (m) 104 that sold the resource to the member consumer.

The announcement may include an offer of the merchant (m) 104 for the resource at a discount price that matches the purchase price of the distinguished transaction. In this manner, member consumers can receive the same deal or a better deal than those received by the other member consumers in the consumer group. The offer may be tailored to the member consumer, such as "Your friend just bought a Super Mario® Wii® computer game for $100 US. We can give you the same deal!"

(c) Automated Gift Concierge

The announcement system 100 may provide a gift concierge function to the member consumers. For example, three of consumers 102 may create a consumer group (the step 502) wherein the member consumers consent to sharing their respective transaction information with one another. One of the three member consumers, such as Sally Smith, may wish to purchase a gift for another of the three member consumers 102 ("friend"). Sally Smith may transmit an inquiry to the host (h) 106 (e.g., the transaction handler (th) 206) requesting information about the past shopping habits of her friend. For example, Sally Smith may request information about the resources that her friend bought, merchants 104 that her friend has purchased from, or the manufacturers of the resources that her friend typically buys (e.g., the step 504). To illustrate, Sally Smith may inquire "What clothing designer does my friend typically use?" or "Has my friend ever purchased music from iTunes® music service in the past?" or "Does my friend like Sears® products?" Thereafter, the host (h) 106 may: search the transaction information stored in the DB 110 to locate the transactions of her friend (the steps 604, 606, and 608) and then facilitate the electronic transmission to Sally Smith (the step 610) of the announcement that includes the information that Sally requested.

Alternatively, or in a combination of the forgoing, Sally Smith may receive an unsolicited announcement indicating that her friend is making a purchase. For example, Sally Smith may receive a message on her cellular telephone that the friend is about to purchase a cup of coffee. This may be initiated, for instance, by the transaction handler (th) 206 receiving an authorization request for her friend's purchase of coffee upon her friend's account. The transaction handler (th) 206 may: determine that the friend is one of the member consumers of the consumer group that includes Sally Smith, and initiate the transmission of the message that arrives at Sally's cellular telephone to inform Sally Smith that her friend is in the coffee shop. Again, such an announcement would be triggered by the satisfaction of predetermined announcement conditions that are associated with the consumer group. Sally Smith may then offer, by use of her cellular telephone, to pay for her friend's coffee purchase by sending a transmission to the payment processing system 200 (e.g., the transaction handler (th) 206) consenting to make the coffee purchase payable upon the account of Sally Smith.

Sally Smith may also request that an electronic message be sent indicating "This one is on me, Sally." In turn, the transaction handler (th) 206 may send an e-mail message to the portable consumer device of her friend that includes Sally's message.

(d) Pooled Currency

In another implementation the member consumers may wish to make a group purchase wherein a resource is purchased with currency from a plurality of corresponding accounts of the member consumers as partial payment toward the group purchase. The partial payments may be processed separately wherein each partial payment is authorized, cleared, and settled individually within the payment processing system 200. Alternatively, or in a combination of the forgoing, the currency may be first pooled together in a mutual account and the transaction for the resource then processed as payable upon the mutual account.

To illustrate, the consumer group may be created. The member consumers in the consumer group may wish to purchase a "gift" for a friend that is not in the consumer group, wherein the resource set is "gift." The "gift" may be identified, such as a Mont Blanc® pen for $500 US from merchant (1) 104. Alternatively, the gift may be unidentified. The member consumers may each submit a corresponding request to the transaction handler (th) 206 requesting that currency (e.g., money or loyalty points) be transferred from their respective account as partial payment towards the gift. The request may include the account identifier of their account and an amount of the currency to transfer as the partial payment. The transaction handler (th) 206 may process each partial payment individually or pool the currency together in a mutual account prior to processing the transaction(s) for the gift. The member consumers may receive announcements including the status of the partial payments, such as an indication of how much more currency is needed in order to cover the cost of the gift.

In one implementation, the transaction handler (th) 206 processes the partial payments individually. The transaction handler (th) 206 may submit each partial payment authorization request individually to each respective issuer (i) 202 of the corresponding accounts of the member consumers. Thereafter, each of the partial payments may be cleared and settled such that the merchant (1) 104 selling the gift receives each partial payment for the gift from each of the corresponding accounts. The transaction handler (th) 206 may, but need not, first store the information in each request until there is enough currency in the requests to cover the purchase price of an identified gift. Once there is enough currency in the requests to cover the cost of the gift, the transaction handler (th) 206 may process each of the partial payments for corresponding authorizations, clearing, and settlements.

In another implementation, the member consumers may have access to a mutual account in which the currency for the gift can first be pooled. The transaction handler (th) 206 may: receive the requests for the partial payments; request the corresponding issuers (i) 202 of the member consumers to transfer the amount of the partial payment to the mutual account (e.g., authorize, clear, and settle a transfer of the funds to the mutual account) such that the mutual account carries a balance including the sum of the currency amounts of the partial payments. The transaction handler (th) 206 may then process a transaction with the merchant (m) 104 selling the gift payable upon the mutual account (e.g., the transaction with the merchant (m) 104 is authorized, cleared, and settled upon the mutual account).

To illustrate, the member consumers may be co-workers in an office. Each co-worker may wish to contribute money toward the purchase of a gift for their boss worth $30 US.

Each member consumer may log onto a website wherein the member consumers enter a request to transfer money from a corresponding identified account of the co-worker (e.g., $5 US from a first co-worker, $10 US from a second co-worker, and $15 US from a third co-worker) as partial payment toward the gift. If the merchant (1) 104 is also identified, the transaction handler (th) 206 may receive the requests and send an authorization request to each respective issuer (i) 202 of the corresponding identified accounts to authorize each respective partial payment. If the merchant (1) 104 is not identified, the transaction handler (th) 206 may either store the respective requests in the DB 110 until such time that the merchant (1) 104 is identified, or send instructions to each respective issuer (i) 202 of the corresponding identified accounts to transfer funds corresponding to the respective partial payment to the mutual account. The mutual account can hold the transferred money until such time that the transaction for the gift is conducted upon the mutual account.

The member consumers may receive the announcement about the pooled currency. For example, the member consumers may receive the announcement including information about how much money has been collected toward the gift and how much money still remains to be collected. In another example, the member consumers may receive the announcement including information about the gift that was bought with the pooled currency. In yet another example, the gift recipient may receive the gift (e.g., a prepaid card loaded with the pooled currency) along with a note from each of the member consumers that made a partial payment toward the gift.

(d) Celebrity Endorsement

The member consumers need not know each other personally. In one implementation, the member consumers in the consumer group may include an endorser (e.g., a celebrity endorser that shops with merchants 104), wherein the member consumers are interested in knowing about the purchases of the endorser at these merchants. For example, a celebrity endorser may engage in a contract with an endorsee, wherein the celebrity may receive compensation if the celebrity agrees to be part of the consumer group. Once the celebrity is included as one of the member consumers of the consumer group, other member consumers can receive announcements about the transactions of the celebrity, such as the transactions of the celebrity conducted on a specified account.

Here, the transaction handler (th) 206 may process, within the payment processing system 200, the transactions of an endorser upon an account of the endorser that is funded by the endorsee (e.g., the merchant (m) 104 that has engaged in the endorsement contract with the endorser). In one implementation, the transaction handler (th) 206 may receive an authorization request for the transaction of the endorser on the account. The authorization request may include a code usable to distinguish the merchant (m) 104 as one of the endorsees. The transaction handler (th) 206 may use the code in the authorization request to distinguish the merchant (m) 104 that engaged in the transaction with the endorser as one of the endorsees. The transaction handler (th) 206 may send an authorization response, which is responsive to the authorization request, for delivery to the merchant (m) 104 that submitted the authorization request. Thereafter, the transaction of the endorser may be cleared and settled within the payment processing system 200 as is known by those of ordinary skill in the relevant art.

Each of the endorsees of the account of the endorser may submit funds to the account. They may each transfer a set amount of funds to the account at a preset schedule, as denoted by the endorsement contract. Alternatively, or in combination, each of the endorsees may receive a statement at the end of a preset period indicating an amount of funds that each of the endorsees need to forward to the account of the endorser. To illustrate, the endorser purchased $50 US of resources from a first endorsee franchisee store, thus the franchisor must forward $50 US plus any applicable fees to the account of the endorser. Thereafter, the first endorsee franchisee store may clear and settle the transaction with the endorser such that the first endorsee franchisee is forwarded the $50 US from the account of the endorser.

Alternatively, the transaction of the endorser may not be cleared and settled such that funds are not transferred to the merchant (m) 104 for the transaction. For example, if the merchant (1) 104 is one of the endorsees, then the merchant (1) 104 may not wish to transfer funds into the account only to receive the funds back from the account. Rather, the merchant (1) 104 may simply wish to reconcile the submitted authorization request. Here, the transaction handler (th) 206 may send, to the endorsee engaged in the transaction with the endorser, data usable to reconcile the transaction with the endorser. For example, the data may include indicia about: the resource purchased (e.g., a SKU), the value of the resource, or the frequency of transactions of the endorser with the endorsee. In one implementation, the endorsee may reconcile the received data by comparing the received data with: submitted authorization requests, logs of transaction of the endorsee, or the terms of the endorsement contract.

To illustrate, Tiger Woods, a golf celebrity, may enter a contract to endorse Nike® products, Starwood® resorts, and PF Chang® restaurants (collectively, "the Endorsees"). As part of the endorsement agreement, Tiger Woods becomes one of the member consumers in the consumer group and is issued an endorsement account within the payment processing system 200, wherein the transaction data for the transactions on the endorsement account can be announced to other member consumers. Tiger Woods may then engage in transactions upon the endorsement account for the resources of any of the Endorsees. Each of the Endorsees would fund the purchase of the corresponding resource of the respective Endorsee that was made by Tiger Woods. In this manner, Tiger Woods would receive the resources without paying for them and in return, the member consumers (e.g., fans of Tiger Woods) would receive announcements about purchases of Tiger Woods. Therefore, if Tiger Woods purchases blue Nike® tennis shoes from a merchant, his fans would receive an announcement indicating the details of purchase of the blue Nike® tennis shoes, and Nike Corporation would pay the merchant for the blue Nike® tennis shoes. Moreover, the fans may receive, in the announcement, a coupon for the blue Nike® tennis shoes from those merchants 104 that also sell the blue Nike® tennis shoes, or the coupon may be for any product manufactures by Nike Corporation. The Endorsees may set limits on the purchases that the celebrity may make. For example, one of the Endorsees may set a payment limit for an amount of funds that the respective endorsee is willing to pay for the transaction upon the endorsement account.

Another Exemplary Payment Processing System

Figure 8:
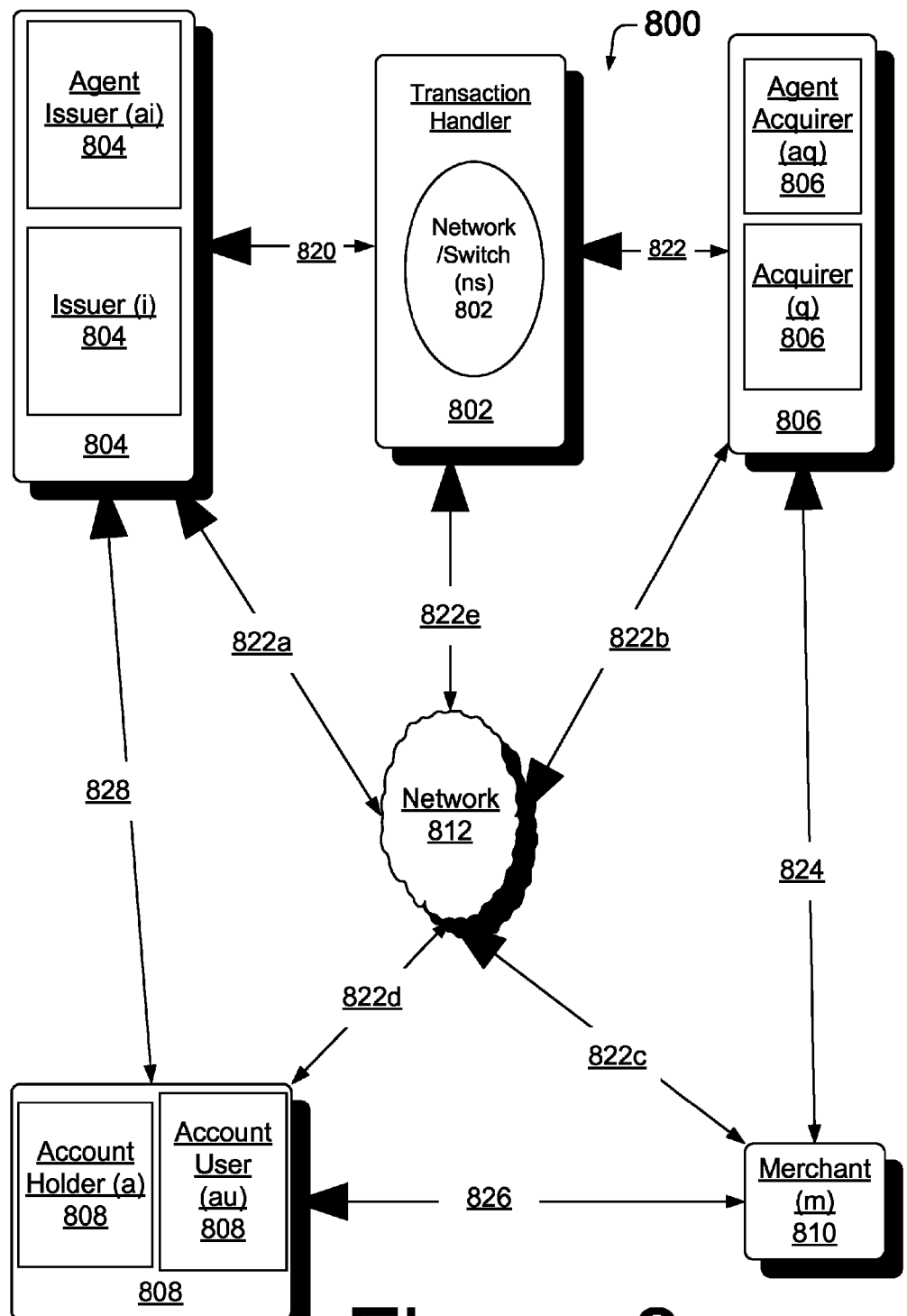
FIG. 8 depicts a block diagram of yet another exemplary payment processing system that can be operated in the environment of FIG. 1.

FIG. 8 illustrates another exemplary payment processing system 800. Payment processing system can be operated in the environment of FIG. 1 which an announcement recipient of the implementations disclosed herein can receive an announcement. The general environment of FIG. 1 include that of a merchant (m) 810, such as the merchant (m) 104, who can conduct a transaction for goods and/or services with an account user (au) (e.g., consumer (c) 102) on an account issued to an account holder (a) 808 by an issuer (i) 804 (e.g., issuer (i) 202), where the processes of paying and being paid for the transaction are coordinated by a transaction handler 802 (e.g., the transaction handler (th) 206). The transaction includes participation from different entities that are each a component of the payment processing system 800. The payment processing system 800 has a plurality of merchants (m) 810 that includes merchant (1) 810 through merchant (M) 810, where M can be up to and greater than an eight digit integer.

Payment processing system 800 has a plurality of accounts 808 each of which is held by a corresponding account holder (1) 808 through account holder (A) 808, where A can be up to and greater than a ten eight digit integer.

Payment processing system 800 includes account user (1) 808 through account user (AU) 808, where AU can be as large as a ten digit integer or larger. Each account user (au) conducts a transaction with merchant (m) 810 for goods and/or services using the account that has been issued by an issuer (i) 804 to a corresponding account holder (a) 808. Data from the transaction on the account is collected by the merchant (m) 810 and forwarded to a corresponding acquirer (a) 806 (e.g., the acquirer (q) 204). Acquirer (a) 806 forwards the data to transaction handler 802 who facilitates payment for the transaction from the account issued by the issuer (i) 804 to account holder (a) 808.

Payment processing system 800 has a plurality of issuers (1–i) 804. Each issuer (i) 804 may be assisted in processing one or more transactions by a corresponding agent issuer (ai) 804, where 'i' can be an integer from 1 to I, where 'ai' can be an integer from 1 to AI, and where I and AI can be as large as an eight digit integer or larger.

Payment processing system 800 has a plurality of acquirers (q) 806. Each acquirer (q) 806 may be assisted in processing one or more transactions by a corresponding agent acquirer (aq) 806, where 'q' can be an integer from 1 to Q, where aq can be an integer from 1 to AQ, and where Q and AQ can be as large as a eight digit integer or larger.

The transaction handler 802 may process a plurality of transactions within the payment processing system 800. The transaction handler 802 can include one or a plurality or networks and switches (ns) 802. Each network/switch (ns) 802 can be a mainframe computer in a geographic location different than each other network/switch (ns) 802, where 'ns' is an integer from one to NS, and where NS can be as large as a four digit integer or larger.

Dedicated communication systems 820, 822 (e.g., private communication network(s)) facilitate communication between the transaction handler 802 and each issuer (i) 804 and each acquirer (a) 806. The Network 812, via e-mail, the World Wide Web, cellular telephony, and/or other optionally public and private communications systems, can facilitate communications 822a-822e among and between each issuer (i) 804, each acquirer (a) 806, each merchant (m) 810, each account holder (a) 808, and the transaction handler 802. Alternatively and optionally, one or more dedicated communication systems 824, 826, and 828 can facilitate respective communications between each acquirer (a) 806 and each merchant (m) 810, each merchant (m) and each account holder (a) 808, and each account holder (a) 808 and each issuer (i) 804, respectively.

Each acquirer (q) 806 may be assisted in processing one or more transactions by a corresponding agent acquirer (aq) 806, where 'q' can be an integer from 1 to Q, where aq can be an integer from 1 to AQ, and where Q and AQ can be as large as a eight digit integer or larger.

Merchant (m) 810 may be a person or entity that sells goods and/or services. Merchant (m) 810 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder (a) 808 may be a second merchant (m) 810 making a purchase from another merchant (m) 810. Merchant (m) 810 may utilize at least one point-of-interaction terminal (e.g., Point of Service or browser enabled consumer cellular telephone) that can communicate with the account user (au) 808, the acquirer (a) 806, the transaction handler 802, or the issuer (i) 804. Thus, the point-of-interaction terminal is in operative communication with the payment processing system 800.

Typically, a transaction begins with account user (au) 808 presenting the portable consumer device to the merchant (m) 810 to initiate an exchange for a good or service. The portable consumer device may be associated with an account (e.g., a credit account) of account holder (a) 808 that was issued to the account holder (a) 808 by issuer (i) 804.

The portable consumer device may be in a form factor that can be a payment card, a gift card, a smartcard, a smart media, a payroll card, a healthcare card, a wrist band, a machine readable medium containing account information, a keychain device, such as a SPEEDPASS® device commercially available from ExxonMobil Corporation, a supermarket discount card, a cellular telephone, personal digital assistant, a pager, a security card, an access card, a wireless terminal, or a transponder. The portable consumer device may include a volatile or non-volatile memory to store information such as the account number or an account holder (a) 808's name.

Merchant (m) 810 may use the point-of-interaction terminal to obtain account information, such as a number of the account of the account holder (a) 808, from the portable consumer device. The portable consumer device may interface with the point-of-interaction terminal using a mechanism including any suitable electrical, magnetic, or optical interfacing system such as a contactless system using radio frequency or magnetic field recognition system or contact system such as a magnetic stripe reader. The point-of-interaction terminal sends a transaction authorization request to the issuer (i) 804 of the account associated with the portable consumer device. Alternatively, or in combination, the portable consumer device may communicate with issuer (i) 804, transaction handler 802, or acquirer (a) 806.

Issuer (i) 804 may authorize the transaction and forward same to the transaction handler 802. Transaction handler 802 may also clear the transaction. Authorization includes issuer (i) 804, or transaction handler 802 on behalf of issuer (i) 804, authorizing the transaction in connection with issuer (i) 804's instructions such as through the use of business rules. The business rules could include instructions or guidelines from the transaction handler 802, the account holder (a) 808, the merchant (m) 810, the acquirer (a) 806, the issuer (i) 804, a related financial institution, or combinations thereof. The transaction handler 802 may maintain a log or history of authorized transactions. Once approved, the merchant (m) 810 may record the authorization, allowing the account user (au) 808 to receive the good or service from merchant (m) or an agent thereof.

The merchant (m) 810 may, at discrete periods, such as the end of the day, submit a list of authorized transactions to the acquirer (a) 806 or other transaction related data for processing through the payment processing system 800. The transaction handler 802 may compare the submitted authorized transaction list with its own log of authorized transactions. The transaction handler 802 may route authorization transaction amount requests from the corresponding the acquirer (a) 806 to the corresponding issuer (i) 804 involved in each transaction. Once the acquirer (a) 806 receives the payment of the authorized transaction from the issuer (i) 804, the acquirer (a) 806 can forward the payment to the merchant (m) 810 less any transaction costs, such as fees for the processing of the transaction. If the transaction involves a debit or pre-paid card, the acquirer (a) 806 may choose not to wait for the issuer (i) 804 to forward the payment prior to paying merchant (m) 810.

There may be intermittent steps in the foregoing process, some of which may occur simultaneously. For example, the acquirer (a) 806 can initiate the clearing and settling process, which can result in payment to the acquirer (a) 806 for the amount of the transaction. The acquirer (a) 806 may request from the transaction handler 802 that the transaction be cleared and settled. Clearing includes the exchange of financial information between the issuer (i) 804 and the acquirer (a) 806 and settlement includes the exchange of funds. The transaction handler 802 can provide services in connection with settlement of the transaction. The settlement of a transaction includes depositing an amount of the transaction settlement from a settlement house, such as a settlement bank, which transaction handler 802 typically chooses, into a clearinghouse, such as a clearing bank, that acquirer (a) 806 typically chooses. The issuer (i) 804 deposits the same from a clearinghouse, such as a clearing bank, which the issuer (i) 804 typically chooses, into the settlement house. Thus, a typical transaction involves various entities to request, authorize, and fulfill processing the transaction.

The payment processing system 800 will preferably have network components suitable for scaling the number and data payload size of transactions that can be authorized, cleared and settled in both real time and batch processing. These include hardware, software, data elements, and storage network devices for the same. Examples of payment processing system 800 include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

Each of the network/switch (ns) 802 can include one or more data centers for processing transactions, where each transaction can include up to 100 kilobytes of data or more. The data corresponding to the transaction can include information about the types and quantities of goods and services in the transaction, information about the account holder (a) 808, the account user (au) 808, the merchant (m) 810, tax and incentive treatment(s) of the goods and services, coupons, rebates, rewards, loyalty, discounts, returns, exchanges, cashback transactions, etc.

By way of example, network/switch (ns) 802 can include one or more mainframe computers (e.g., one or more IBM mainframe computers) for one or more server farms (e.g., one or more Sun UNIX Super servers), where the mainframe computers and server farms can be in diverse geographic locations.

Each issuer (i) 804 (or agent issuer (ai) 804 thereof) and each acquirer (a) 806 (or agent acquirer (aq) 806 thereof) can use or more router/switch (e.g., Cisco™ routers/switches) to communicate with each network/switch (ns) 802 via dedicated communication systems.

Transaction handler 802 can store information about transactions processed through payment processing system 800 in data warehouses such as may be incorporated as part of the plurality of networks/switches 802. This information can be data mined. The data mining transaction research and modeling can be used for advertising, account holder and merchant loyalty incentives and rewards, fraud detection and prediction, and to develop tools to demonstrate savings and efficiencies made possible by use of the payment processing system 800 over paying and being paid by cash, or other traditional payment mechanisms.

The VisaNet® system is an example component of the transaction handler 802 in the payment processing system 800. Presently, the VisaNet® system is operated in part by Visa Inc. As of 2007, the VisaNet® system Inc. was processing around 300 million transaction daily, on over 1 billion accounts used in over 170 countries. Financial instructions numbering over 16,000 connected through the VisaNet® system to around 30 million merchants (m) 810. In 2007, around 81 billion transactions for about 4 trillion U.S. dollars were cleared and settled through the VisaNet® system, some of which involved a communication length of around 24,000 miles in around two (2) seconds.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in computer readable medium that can be loaded onto a general purpose computer, a special purpose computer, or other programmable apparatus.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method, comprising:
submitting, by a first merchant to a transaction handler computer, using a computing apparatus, a bid to receive an announcement after at least one criterion of an announcement condition is satisfied, the announcement including data about a consumer, and the at least one criterion including presence of the consumer within a zone, wherein:
the bid is submitted within a payment processing system that includes the transaction handler computer,
the transaction handler computer is configured to process a plurality of transactions between merchants and consumers, including a first transaction between the first merchant and the consumer, the consumer having a payment account within the payment processing system issued to the consumer by an issuer, and
the transaction handler computer is further configured to use transaction information received in an authorization request for a transaction of the consumer with a second merchant to determine if the at least one criterion is satisfied;
receiving, from the transaction handler computer, using the computing apparatus, notification that the bid is a winning bid;
after the at least one criterion is satisfied, receiving, from the transaction handler computer, using the computing apparatus, the announcement, wherein the announcement includes a name of the consumer and data about the transaction of the consumer with the second merchant; and in response to receiving the announcement from the transaction handler computer:
providing, directly from the first merchant, without first sending to the transaction handler computer, a communication to a portable consumer device of the consumer, wherein the communication is personalized for the consumer based on the data about the consumer included in the announcement, and
sending a transmission, different from the communication, to the transaction handler computer, wherein the transmission is to be sent by the transaction handler computer to the issuer of the payment account of the consumer.

2. The method as defined in claim 1, further comprising receiving, using the computing apparatus, an auction initiation communication indicating that an auction for the announcement has begun.

3. The method as defined in claim 1, further comprising forming, using the computing apparatus, a first transmission including information usable to:
determine a location of the consumer; and
compare the location to the zone.

4. The method as defined in claim 3, wherein:
a first criterion of the at least one criterion is satisfied after the location is matched with the zone; and
a second criterion of the at least one criterion is satisfied after there is a match of at least one of:
an account characteristic of the account with a required account characteristic;
a transaction history of the account with a required tendency to purchase a specific type of resource; and
a demographic of the consumer with a required demographic, wherein the demographic is associated with the payment account.

5. The method as defined in claim 3, further comprising receiving, using the computing apparatus, a second transmission including first data from the portable consumer device of the consumer, wherein a portion of the first data is included in the first transmission.

6. The method as defined in claim 5, wherein the portable consumer device is selected from the group consisting of:
a financial card;
a contactless device including a wireless processor, a transmitter, and a receiver;
a smart card;
a cellular telephone;
a personal digital assistant;
a digital audio player;
a global positioning system enabled device;
a computer; and
a combination of any of the above.

7. The method as defined in claim 5, further comprising specifying, using the computing apparatus, the at least one criterion to be matched to the first data.

8. The method as defined in claim 1, wherein the auction is of a type selected from the group consisting of:
English auction;
Dutch auction;
sealed-bid first-price auction;
sealed-bid second-price auction;
supply auction;
demand auction;
double auction;
open auction;
closed auction;
buyout auction;
raffle; and
combinations of any of the above.

9. The method as defined in claim 1, further comprising:
submitting, by the first merchant, the first transaction to an acquirer for processing by the transaction handler computer, the processing comprising requesting the issuer to obtain payment for the first transaction from the payment account of the consumer; and
receiving, by the first merchant, the payment from the acquirer.

10. The method as defined in claim 1, wherein the at least one criterion includes electronically receiving a transaction occurring:
within a specified time interval;
with a merchant located in the zone; and
upon the payment account issued to the consumer by the issuer.

11. A non-transitory computer readable medium including stored instructions that, when executed by a computing device, cause the computing device to:
submit, by a first merchant to a transaction handler computer, using a computing apparatus, a bid for an option to receive data for communicating with a consumer after at least one announcement condition occurs, the at least one announcement condition including presence of the consumer within a spatial zone, wherein:
the bid is submitted within a payment processing system that includes the transaction handler computer,
the transaction handler computer is configured to process a plurality of transactions between merchants and consumers, including a transaction between the first merchant and the consumer, the consumer having a payment account within the payment processing system issued to the consumer by an issuer, and
the transaction handler computer is further configured to use transaction information received in an authorization request for a transaction of the consumer with a second merchant to determine if the at least one announcement condition occurs;
receive, by the first merchant from the transaction handler computer, using the computing apparatus, notification that the bid is a winning bid;
receive, by the first merchant, first information from a portable consumer device of the consumer, the first information usable to determine a location of the consumer;
send, from the first merchant to the transaction handler computer, a transmission including the first information;
after receiving the notification and after the at least one announcement condition occurs, receive, from the transaction handler computer, the data for communicating with the consumer, the data including a name of the consumer and data about the transaction of the consumer with the second merchant; and
in response to receiving the data for communicating with the consumer:
providing, directly from the first merchant, without first sending to the transaction handler computer, a communication to the portable consumer device of the consumer, wherein the communication is personalized for the consumer based on the data received for communicating with the consumer, and
sending a transmission, different from the communication, to the transaction handler computer, wherein the transmission is to be sent by the transaction handler computer to the issuer of the payment account.

12. The computer readable medium of claim 11, wherein the first information includes at least one of:
   a merchant identification code associated with a merchant having a known location;
   an altitude of the portable consumer device;
   a latitude of the portable consumer device;
   a longitude of the portable consumer device;
   World Geodetic System coordinates of the portable consumer device;
   data usable to determine a direction of movement of the portable consumer device; and
   data usable to determine a speed of the portable consumer device.

13. The method as defined in claim 1, wherein the submitting the bid comprises transmitting a signal from a cellular telephone.

14. The method as defined in claim 3, wherein the first transmission is a signal from a cellular telephone.

15. The method as defined in claim 1, further comprising sending the announcement to the portable consumer device of the consumer via an RFID transmission.

16. The method as defined in claim 1, further comprising reading an account identifier from an RFID reader, and sending a transmission to the transaction handler computer, the transmission including the account identifier and further including data usable to determine a location of the RFID reader.

17. The method as defined in claim 1, further comprising sending a transmission, the transmission including data received from a global positioning system receiver of the portable consumer device of the consumer.

18. The method as defined in claim 1, wherein the communication includes data received in the announcement from the transaction handler computer, and the communication further includes a discount for the consumer to receive when the consumer engages in a transaction with the first merchant.

* * * * *